(12) United States Patent
Kato et al.

(10) Patent No.: US 11,247,338 B2
(45) Date of Patent: Feb. 15, 2022

(54) ROBOT SYSTEM AND CUTTING BLADE

(71) Applicant: KYORAKU CO., LTD., Kyoto (JP)

(72) Inventors: Takeshi Kato, Gifu (JP); Yoshinori Ono, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 327 days.

(21) Appl. No.: 16/468,559

(22) PCT Filed: Dec. 14, 2017

(86) PCT No.: PCT/JP2017/044990
§ 371 (c)(1),
(2) Date: Jun. 11, 2019

(87) PCT Pub. No.: WO2018/110677
PCT Pub. Date: Jun. 21, 2018

(65) Prior Publication Data
US 2019/0299414 A1 Oct. 3, 2019

(30) Foreign Application Priority Data

Dec. 15, 2016 (JP) .............................. JP2016-243135
Feb. 24, 2017 (JP) .............................. JP2017-033362

(51) Int. Cl.
*B25J 9/16* (2006.01)
*B65H 35/06* (2006.01)
(Continued)

(52) U.S. Cl.
CPC .......... *B25J 9/1687* (2013.01); *B25J 15/0019* (2013.01); *B25J 15/08* (2013.01);
(Continued)

(58) Field of Classification Search
CPC ........ B25J 9/042; B25J 9/1679; B25J 9/1687; B25J 11/0055; B25J 15/0019; B25J 15/0052; B25J 15/008
See application file for complete search history.

(56) References Cited

U.S. PATENT DOCUMENTS

| 5,705,024 A | 1/1998 | Bainbridge et al. |
| 2011/0014837 A1* | 1/2011 | Baqai ................ B32B 5/026 442/151 |

FOREIGN PATENT DOCUMENTS

| JP | S55-106722 A | 8/1980 |
| JP | S63-42512 U | 3/1988 |
(Continued)

OTHER PUBLICATIONS

Office Action dated Aug. 18, 2020 in corresponding Japanese Application No. 2017-033362; 13 pages including English-language translation.
(Continued)

*Primary Examiner* — Jermie E Cozart
(74) *Attorney, Agent, or Firm* — Maier & Maier, PLLC

(57) ABSTRACT

A robot system capable of separating an adhesive member from a cover material and sticking the adhesive member on an object without a complicated setting. A robot system including a sticking mechanism configured to clamp and stick an adhesive member on an object and a supply mechanism capable of supplying the adhesive member, wherein the sticking mechanism includes a robot hand configured to clamp and release the adhesive member and a robot arm configured to move the robot hand; and the supply mechanism is separate from the sticking mechanism, supplies the adhesive member in a state that the adhesive member is stuck to a cover material, and separates the cover material from the adhesive member.

8 Claims, 23 Drawing Sheets

(51) Int. Cl.
    *B65C 3/00*         (2006.01)
    *B25J 15/08*      (2006.01)
    *B65C 9/30*        (2006.01)
    *B25J 15/00*      (2006.01)
    *B25J 11/00*      (2006.01)
    *B25J 9/04*        (2006.01)

(52) U.S. Cl.
    CPC .................. *B65C 3/00* (2013.01); *B65C 9/30* (2013.01); *B65H 35/06* (2013.01); *B25J 9/042* (2013.01); *B25J 9/1679* (2013.01); *B25J 11/0055* (2013.01); *B25J 15/008* (2013.01); *B25J 15/0052* (2013.01)

(56) References Cited

FOREIGN PATENT DOCUMENTS

| | | |
|---|---|---|
| JP | S63-114048 A | 5/1988 |
| JP | S63191368 U | 12/1988 |
| JP | H04-018476 A | 1/1992 |
| JP | H04-17096 U | 2/1992 |
| JP | H0417096 U | 2/1992 |
| JP | H07-315350 A | 12/1995 |
| JP | H08118298 A | 5/1996 |
| JP | H09-104424 A | 4/1997 |
| JP | 3057440 U | 6/1999 |
| JP | H11-207691 A | 8/1999 |
| JP | 2002-205718 A | 7/2002 |
| JP | 2002-274516 A | 9/2002 |
| JP | 2011-121770 A | 6/2011 |
| JP | 2015-063365 A | 4/2015 |

OTHER PUBLICATIONS

The partial supplementary European Search Report dated Dec. 10, 2019, in connection with corresponding EP Application No. 17880315.1 (12 pgs.).

International Search Report dated Feb. 13, 2018 in corresponding International Application No. PCT/JP2017/044990; 6 pages.

Japanese Office Action dated Apr. 6, 2021, in connection with corresponding JP Application No. 2017-033362 (10 pp., including machine-generated English translation).

Japanese Office Action dated Nov. 9, 2021, in connection with corresponding Japanese application No. 2017-033362 (8 pp., including machine-generated English translation).

* cited by examiner

A-A cross-sectional view

A-A
cross-sectional view

ROBOT SYSTEM AND CUTTING BLADE

TECHNICAL FIELD

The present invention relates to a robot system capable of clamping and sticking an adhesive member, such as a nonwoven fabric, on an object, such as an automobile interior member (for example, deck board) and further relates to a cutting blade used for cutting and forming the adhesive member.

BACKGROUND ART

In recent years, labor saving by means of a robot has been promoted in factories. PTL 1 discloses a technique for separating an attached material covering an adhesive part of a target object by means of an attached material separation unit with a needle unit. In PTL 1, the attached material on the target object approaches a sharp point of the needle unit at a predetermined approach angle to separate the attached material from the target object.

CITATION LIST

Patent Literature

[PTL 1] JP-A-2011-121770

SUMMARY

The technique disclosed in PTL 1 requires some labor and time for a setting of a robot since a method of separating the attached material is complicated.

The present invention has been made in view of such a circumstance and is to provide a robot system capable of separating an adhesive member from a cover material and sticking the adhesive member on an object without a complicated setting.

According to the present invention, provided is a robot system comprising a sticking mechanism configured to clamp and stick at least one adhesive member on an object and a supply mechanism capable of supplying the adhesive member, wherein: the sticking mechanism comprises a robot hand configured to clamp and release the adhesive member and a robot arm configured to move the robot hand; the supply mechanism is separate from the sticking mechanism, supplies the adhesive member in a state that the adhesive member is stuck to a cover material, and separates the cover material from the adhesive member by bending the cover material in a direction away from the adhesive member in order to enable the robot hand to clamp the adhesive member in a state that the cover material is separated from the adhesive member.

In the present invention, the robot hand is configured to clamp the adhesive member while the adhesive member is separated from the cover material by bending the cover material, and thus it is possible to separate the adhesive member from the cover material and stick the adhesive member on the object without a complicated setting. In addition, since the supply mechanism is separate from the sticking mechanism, the robot hand can be downsized.

Hereinafter, various embodiments of the present invention are exemplified. The embodiments below can be combined with each other.

Preferably, the robot hand comprises at least one clamping unit configured to clamp and release the adhesive member.

Preferably, the clamping unit comprises a clamping mechanism configured to clamp and release the adhesive member and a pressing mechanism configured to press the adhesive member against the object.

Preferably, the clamping mechanism comprises a clamping base with a base surface and a first cylinder mechanism, wherein the first cylinder mechanism comprises a first cylinder base and a first rod, a projection length of the first rod from the first cylinder base being variable, and the clamping mechanism is configured to clamp the adhesive member between the base surface and the first rod.

Preferably, the pressing mechanism comprises a rotary base rotatable relative to the clamping base and a pressing part provided on the rotary base and pressed against the adhesive member.

Preferably, the rotary base is urged in a direction in which the pressing part is pressed against the adhesive member.

Preferably, the pressing mechanism comprises a second cylinder mechanism, wherein the second cylinder mechanism comprises a second cylinder base and a second rod, a projection length of the second rod from the second cylinder base is variable, and the pressing mechanism is configured to adjust an angle of the rotary base relative to the clamping base by changing the projection length of the second rod.

Preferably, the robot hand comprises a third cylinder mechanism, wherein the third cylinder mechanism comprises a third cylinder base and a third rod, a projection length of the third rod from the third cylinder base is variable, and the clamping unit is provided on the third rod.

Preferably, the robot hand comprises a plurality of clamping units arranged in a line, wherein the supply mechanism is configured to supply a plurality of adhesive members arranged in a line, and the robot hand is configured to simultaneously clamp the plurality of adhesive members by the plurality of clamping units.

Preferably, the robot hand is configured to cause the plurality of clamping units to project one by one so as to stick the plurality of adhesive members one by one to the object.

Preferably, the adhesive member is a nonwoven fabric.

BRIEF DESCRIPTION OF DRAWINGS

FIG. 3B is a bottom view, and FIG. 3A is a cross-sectional view taken along a line A-A in FIG. 3B.

FIG. 4B is a bottom view, and FIG. 4A is a cross-sectional view taken along a line A-A in FIG. 4B.

FIG. 6A is a front view, and FIG. 6B is a bottom view.

FIG. 7A is a front view, and FIG. 7B is a bottom view.

FIG. 15A is a perspective view as viewed from an upper surface side, and FIG. 15B is a perspective view as viewed from a bottom surface side.

DESCRIPTION OF EMBODIMENTS

Hereinafter, embodiments of the present invention are described. Various characteristics described in the embodiments below may be combined with each other. Further, each characteristic is independently inventive.

A: Embodiment of Robot System

Figure 1:
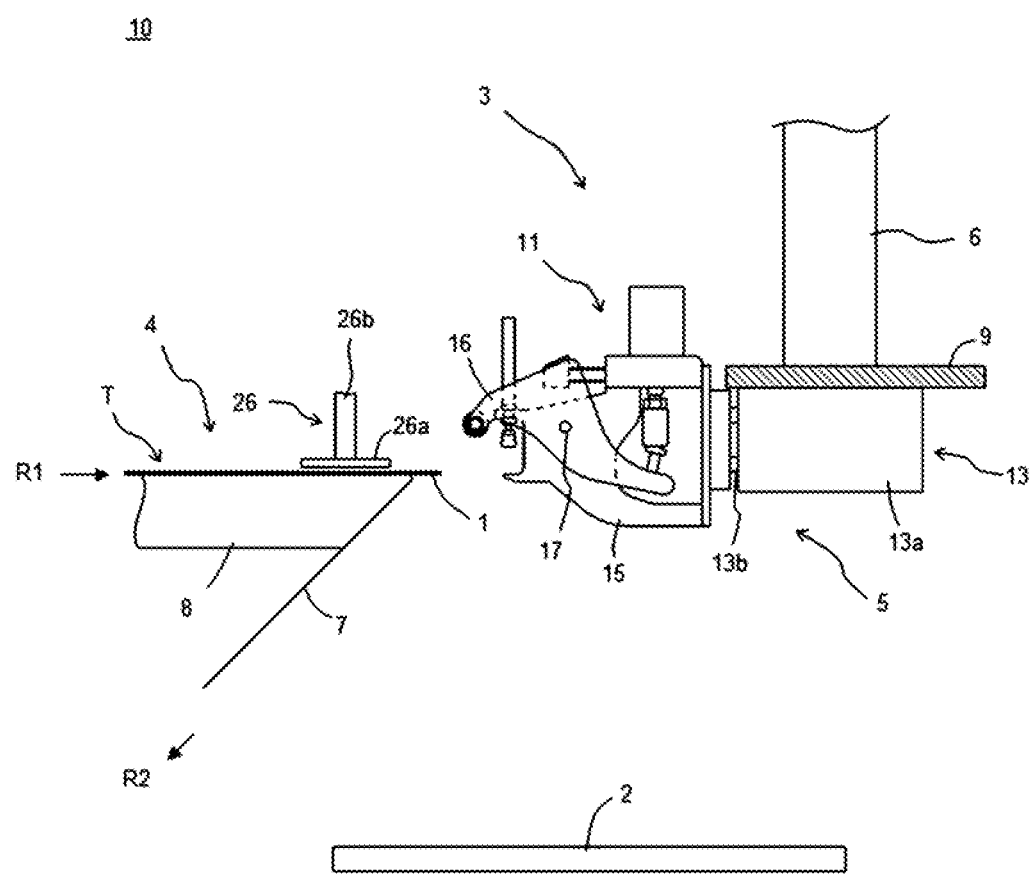
FIG. 1 is a front view illustrating a robot system 10 according to an embodiment of the present invention.

As illustrated in FIG. 1, a robot system 10 of an embodiment of the present invention comprises a sticking mechanism 3 configured to clamp and stick an adhesive member 1 on an object 2 and a supply mechanism 4 capable of supplying an adhesive member 1. The sticking mechanism 3 comprises a robot hand 5 configured to clamp and release the adhesive member 1 and a robot arm 6 configured to move the robot hand 5.

<Adhesive Member 1, Object 2, Supply Mechanism 4>

Figure 2:
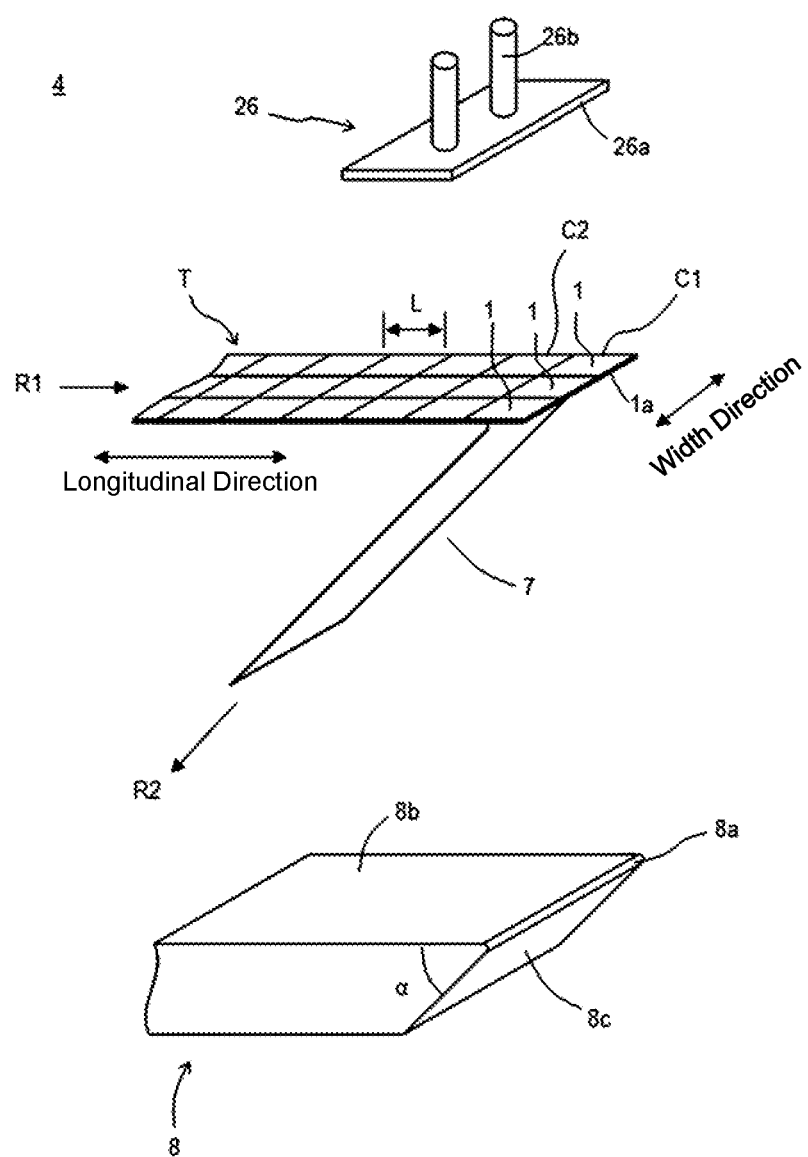
FIG. 2 is an exploded perspective view of a supply mechanism 4.

As illustrated in FIG. 2, the adhesive member 1 comprises an adhesive layer 1a on one surface and is configured to be stuck on the object 2 by pressing the adhesive member 1 against the object 2 while the adhesive layer 1a faces the object 2. In the present embodiment, the adhesive member 1 is assumed to have a certain thickness. The thickness of the adhesive member 1 is, for example, 0.5 to 5 mm, and specifically, for example, 0.5, 1, 1.5, 2, 2.5, 3, 3.5, 4, 4.5, 5 mm and may be within a range between any two of the values exemplified herein. The adhesive member 1 is stuck on the object 2 for the purpose of preventing rattling or a vibration, noise reduction, or the like. A material thereof is not specifically limited, and may be, for example, a nonwoven fabric. It is difficult to pick up a nonwoven fabric by a vacuum suction mechanism due to air permeability thereof. As will be described below, the sticking mechanism 3 picks up the adhesive member 1 by clamping the adhesive member 1 with the robot hand 5. Therefore, it is possible to reliably pick up the adhesive member 1 even if the adhesive member 1 is made of a material having air permeability, such as a nonwoven fabric. The object 2 may be, for example, an automobile interior member, such as a deck board.

A cover material 7 is stuck on a surface of the adhesive member 1 on a side of the adhesive layer 1a. The cover material 7 has a function of covering the adhesive layer 1a. A paper or a sheet (so-called release paper) whose surface facing the adhesive layer 1a is subjected to easy peeling treatment is suitably used as the cover material 7. A large number of adhesive members 1 are arranged in a grid pattern on the cover material 7. Three adhesive members 1 are arranged in a line in a width direction (direction perpendicular to a longitudinal direction) of the cover material 7. A large number of adhesive members 1 are continuously arranged in the longitudinal direction of the cover material 7. A tape member T configured by arranging a large number of adhesive members 1 on the cover material 7 can be formed by sticking the cover material 7 on an adhesive layer of a large-area sheet and then making a cut (half-cut) in the large-area sheet so as to include the large number of adhesive members 1. The adhesive member 1 may be preferably rectangular or square in order to easily manufacture the adhesive member 1 by half cutting of the large-area sheet. A length of the adhesive member 1 in a longitudinal direction and a width direction may be preferably 1 to 5 cm, specifically, for example, 1, 2, 3, 4, 5 cm, or may be in a range between any two of the values exemplified herein.

The supply mechanism 4 comprises a delivery roller R1, a take-up roller R2, and a bending jig 8 provided therebetween. A tape member roll in which the tape member T is wound is mounted on the delivery roller R1, and the tape member T is supplied toward a bending jig 8 associated with a rotation of the delivery roller R1 in a rewinding direction. The adhesive member 1 is separated from the cover material 7 by the bending jig 8 by bending the cover material 7 in a direction away from the adhesive member 1. The adhesive member 1 in this state is clamped by the robot hand 5. The cover material 7 is wound up associated with a rotation of the take-up roller R2. Rotation speeds of the delivery roller R1 and the take-up roller R2 are adjusted so as to maintain a state in which the cover material 7 is tensioned. Further, a tension roller for adjusting a tension applied to the cover material 7 is provided as needed between the delivery roller R1 and the take-up roller R2.

When the adhesive member 1 has a large thickness as in a case of a nonwoven fabric, an outer diameter of the tape member roll tends to be large, and thus it is difficult to integrate the supply mechanism 4 with the sticking mechanism 3. Therefore, when the adhesive member 1 has a large thickness as in a case of a nonwoven fabric, there is great technical significance in adopting a configuration in which the supply mechanism 4 is separate from the sticking mechanism 3 as in the present embodiment.

The bending jig 8 comprises a tip 8a, an upper surface 8b, and an inclined surface 8c. The tip 8a is provided to join with the upper surface 8b and the inclined surface 8c. The cover material 7 is guided from the delivery roller R1 to the take-up roller R2 via the upper surface 8b, the tip 8a, and the inclined surface 8c in this order. An angle between the upper surface 8b and the inclined surface 8c at the tip 8a is not specifically limited, and may be for example, 15 to 75 degrees, preferably 30 to 60 degrees, and more preferably 40 to 50 degrees. This is because the adhesive member 1 can be easily separated from the cover material 7 in a case of such an angle. A radius of curvature of the tip 8a may be preferably equal to or less than a length L of the adhesive member 1 in a longitudinal direction, because the adhesive member 1 can be easily separated from the cover material 7 in such a case. The value of the radius of curvature of the tip 8a/length L may be, for example, 0.1 to 1, specifically, for example, 0.01, 0.05, 0.1, 0.2, 0.3, 0.4, 0.5, 0.6, 0.7, 0.8, 0.9, 1, or may be in a range between any two of the values exemplified herein. Further, the radius of curvature of the tip 8a may be, for example, 0.1 to 20 mm, preferably, 0.5 to 5 mm, specifically, for example, 0.1, 0.5, 1, 2, 3, 4, 5, 6, 7, 8, 9, 10, 11, 12, 13, 14, 15, 16, 17, 18, 19, 20 mm, or may be in a range between any two of the values exemplified herein.

A pressing means 26 is provided at a position facing the upper surface 8b. As illustrated in FIGS. 1 and 2, the pressing means 26 is provided so as to press the adhesive members 1 in the second row C2 while the adhesive members 1 in a top row C1 are being separated from the cover material 7, without pressing the adhesive members 1 in the top row C1. The robot hand 5 of the sticking mechanism 3 clamps and pick up the adhesive members 1 in the top row C1 while the pressing means 26 presses the adhesive members 1 in the second row C2. This can prevent the adhesive members 1 in the second row C2 from being picked up together. The pressing means 26 may press only the adhesive members 1 in the second row C2 or may press the adhesive members 1 in a third and subsequent rows together. In one example, the pressing means 26 comprises a plate part 26a coming into contact with the adhesive members 1 and a cylinder mechanism 26b for pressing the plate part 26a against the adhesive members 1.

<Sticking Mechanism 3>

The sticking mechanism 3 comprises the robot hand 5 and the robot arm 6. The robot arm 6 has a function of moving the robot hand 5, and specifically has a function of moving the robot hand 5, after the robot hand 5 clamps and picks up the adhesive member 1, to a position on the object 2 where the adhesive member 1 is stuck. The robot arm 6 has any number of shafts necessary to realize the above-described function and may preferably have six or more shafts.

Figure 3A:
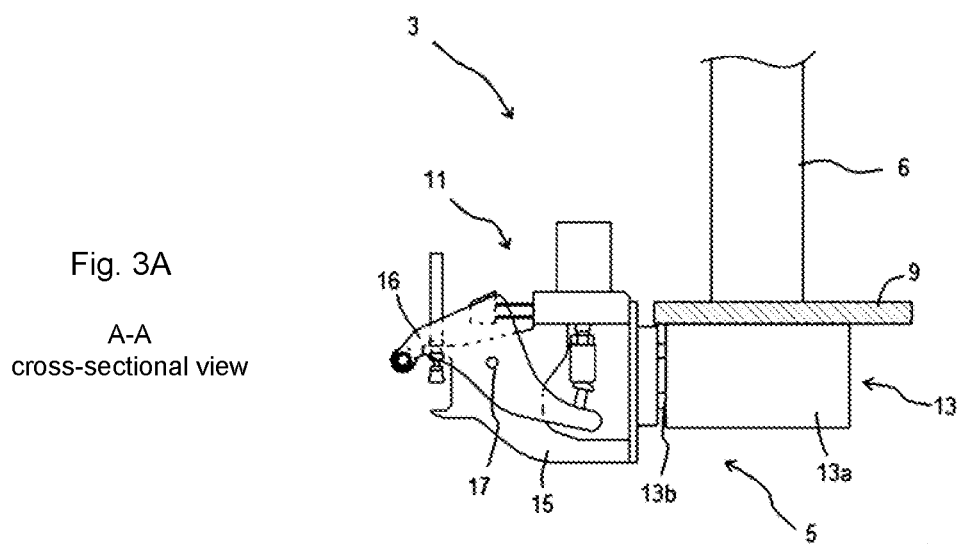
FIGS. 3A and 3B illustrate a sticking mechanism 3.
Figure 3B:
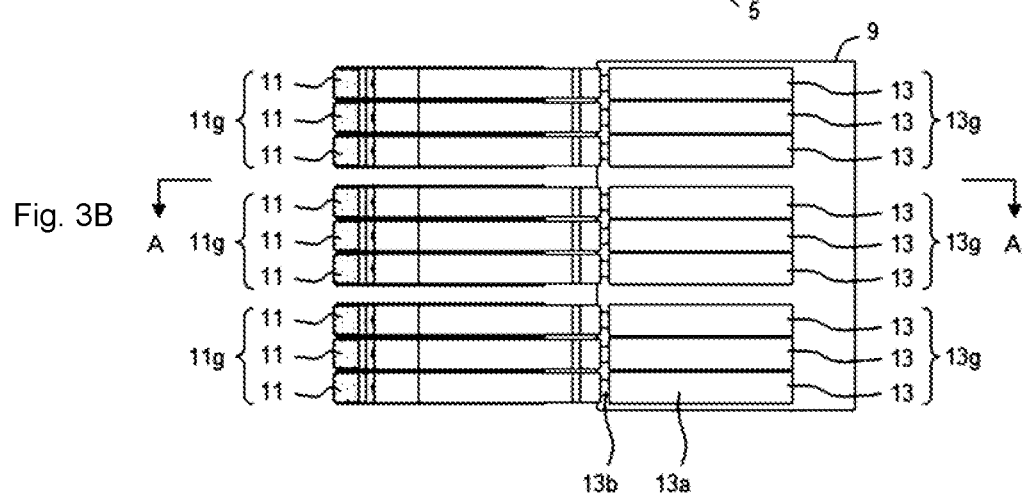

The robot hand 5 comprises a holding plate 9. As illustrated in FIGS. 3A and 3B, nine cylinder mechanisms 13 are fixed to the holding plate 9. A cylinder mechanism group 13g includes three cylinder mechanisms 13 adjacent to each other so as to be aligned in a width direction. Therefore, three cylinder mechanism groups 13g are configured from the nine cylinder mechanisms 13 fixed to the holding plate 9. There is a space between adjacent cylinder mechanism groups 13g.

Each of the cylinder mechanisms 13 comprises a cylinder base 13a and a rod 13 b, a projection length of the rod 13b from the cylinder base 13a being variable. A clamping unit 11 is attached to each rod 13b. A clamping unit group 11g includes three clamping units 11 adjacent to each other so as to be arranged in a line in a width direction. Three clamping unit groups 11g are configured to correspond to the three cylinder mechanism groups 13g. There is a space between adjacent clamping unit groups.

Each of the clamping units 11 is configured to clamp and release one adhesive member 1. Therefore, the clamping unit group 11g including the three clamping units 11 arranged in a line in a width direction is configured to simultaneously clamp three adhesive members 1 arranged in a line in a width direction, as illustrated in FIG. 2.

When a first clamping unit group 11g clamps and picks up three adhesive members 1 in the top row C1, the delivery roller R1 and the take-up roller R2 rotate by a length of one row in a longitudinal direction of the adhesive member 1, and the adhesive members 1 in the second row C2 are delivered to a position of the top row C1, being separated from the cover material 7. Then, a second clamping unit group 11g clamps and picks up the three adhesive members 1 delivered to the position of the top row C1. Thereafter, a similar step is performed again, and a third clamping unit group 11g clamps and picks up three adhesive members 1 delivered to the position of the top row C1. Through the above-mentioned step, nine adhesive members 1 are clamped and picked up by nine clamping units 11 by three operations.

Figure 4A:
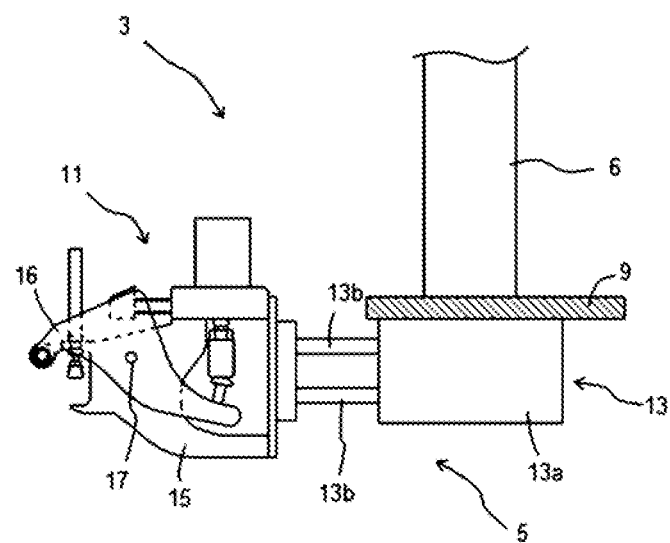
FIGS. 4A and 4B illustrate a state in which one of nine clamping units 11 is projected.
Figure 4B:
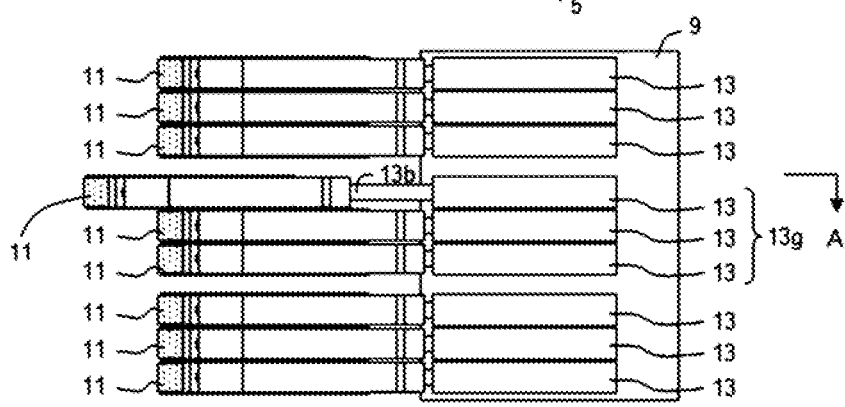

The nine adhesive members 1 clamped by the nine clamping units 11 are stuck one by one on the object 2. The adhesive layer 1a of the adhesive member 1 is exposed, and thus if the clamping unit 11 approaches the object 2 to stick one adhesive member 1 on the object 2, another adhesive member 1 may be unintentionally stuck on the object 2. In the present embodiment, one clamping unit 11 is projected beyond the other clamping units 11, as illustrated in FIGS. 4A and 4B, by operating the cylinder mechanism 13 to which the clamping unit 11 clamping the adhesive member 1 to be stuck on the object 2 is attached and elongating a projection length of the rod 13b. According to such a configuration, the projecting clamping unit 11 can be closer to the object 2 than the other clamping units 11, and thus it is possible to stick only the adhesive member 1 to be stuck on the object 2. That is, the nine clamping units 11 can be projected one by one by operating the nine cylinder mechanisms 13 one by one, thereby allowing the nine adhesive members 1 to be stuck one by one.

As illustrated in FIGS. 5 to 7B, the clamping unit 11 comprises a clamping base 15 and a rotary base 16. The rotary base 16 is fixed at a shaft part 17 so as to be rotatable relative to the clamping base. 15 The clamping base 15 is provided with cylinder mechanisms 18, 19. The cylinder mechanism 18 comprises a cylinder base 18a and a rod 18b, a projection length of the rod 18b from the cylinder base 18a being variable. The cylinder mechanism 19 comprises a cylinder base 19a and a rod 19b, a projection length of the rod 19b from the cylinder base 19a being variable. The cylinder bases 18a, 19a are fixed to the clamping base 15. When the projection length of the rod 18b is elongated by operating the cylinder mechanism 18, the adhesive member 1 can be clamped between the rod 18b and a base surface 15a. A contact part 27 coming into contact with the adhesive member 1 is attached to a tip of the rod 18b. The contact part 27 may be preferably formed of a material softer than the rod 18b. In such a case, the contact part 27 comes in contact with the adhesive member 1 to prevent the adhesive member 1 from being damaged during clamping. The rod 19b is provided with a contact part 28 coming into contact with a positioning bolt 25. The clamping base 15 is provided with an urging member support part 21 supporting an urging member 20.

Figure 6A:
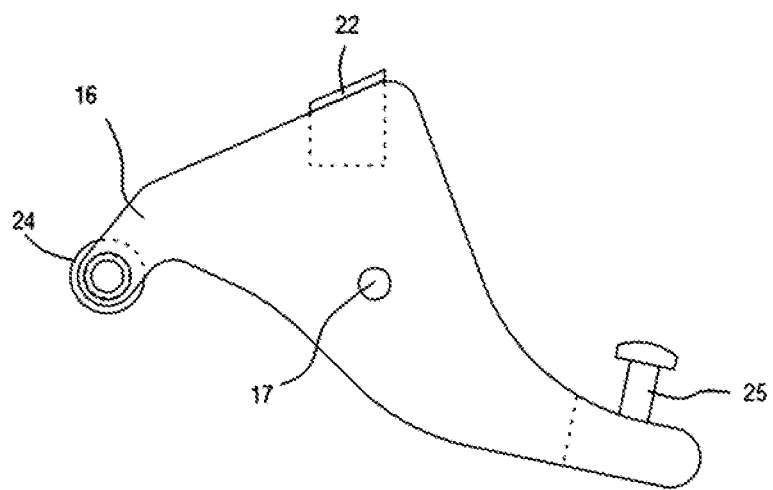
FIGS. 6A and 6B illustrate a rotary base 16 and members fixed thereto in FIG. 5.
Figure 6B:
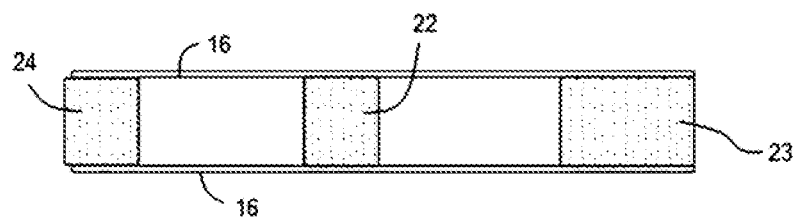

As illustrated in FIGS. 6A and 6B, the rotary base 16 is a plate-shaped member, and a contact block 22, a support block 23, and a pressing part 24 are provided between a pair of rotary bases 16. The support block 23 is provided with a positioning bolt 25. The pressing part 24 may be, for example, a roller supported rotatably relative to the rotary base 16.

Figure 5:
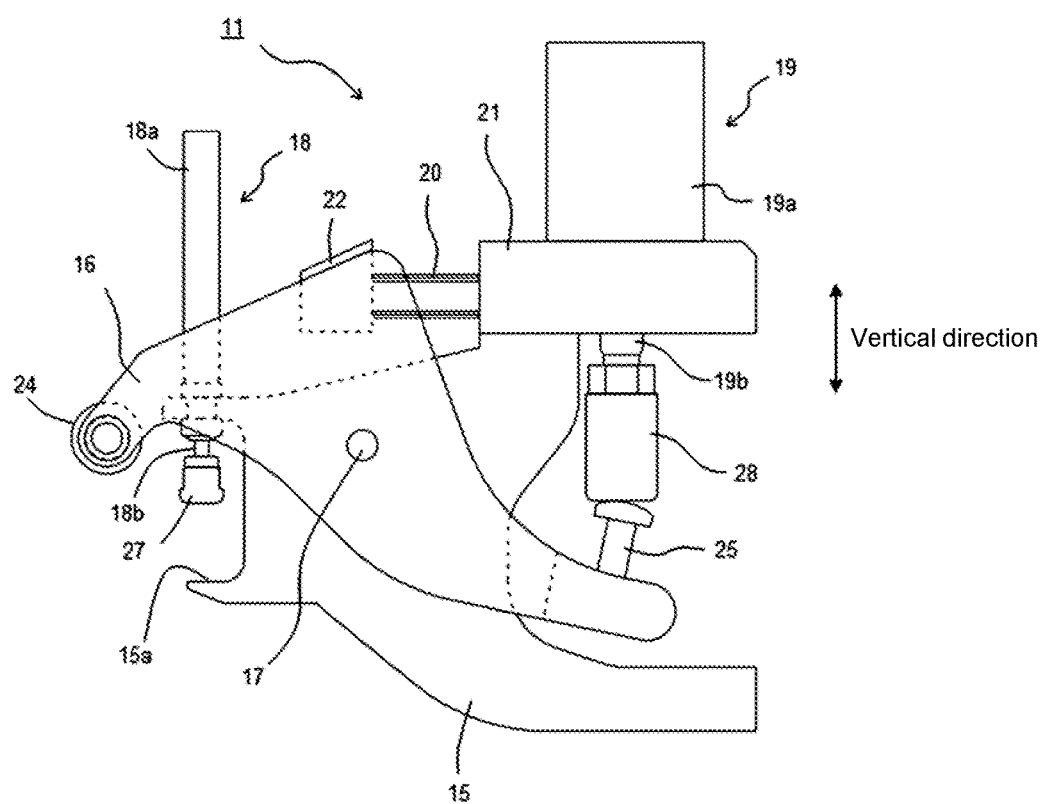
FIG. 5 is an enlarged front view of the clamping units 11.
Figure 7A:
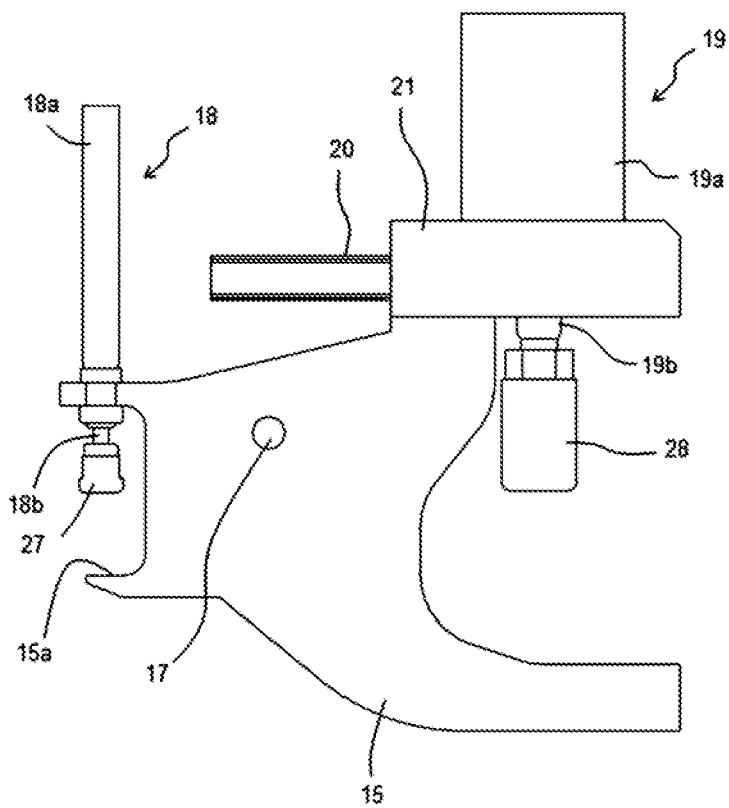
FIGS. 7A and 7B illustrate a clamping base 15 and members fixed thereto in FIG. 5.
Figure 7B:
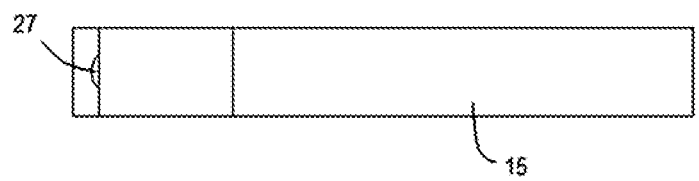

As illustrated in FIG. 5, the urging member 20 is an elastic member, for example, a coil spring, and is disposed between the urging member support part 21 and the contact block 22 in a state of being contracted compared to a natural length (note that FIGS. 7A and 7B illustrate a state in which the urging member 20 is in a natural length). Therefore, the urging member 20 has a restoring force to regain the natural length, and the rotary base 16 is urged counterclockwise by the restoring force. When the rotary base 16 rotates counterclockwise, the pressing part 24 is pressed against the adhesive member 1 clamped between the contact part 27 and the base surface 15a. A "pressing direction" in Claims is thus counterclockwise in the present embodiment.

When the rotary base 16 is urged in a counterclockwise direction, the positioning bolt 25 is pressed against the contact part 28. Since the contact part 28 is fixed to the rod 19b, the contact part 28 does not move unless the rod 19b is retracted (unless the projection length of the rod 19b is shortened). An angle of the rotary base 16 relative to the clamping base 15 is thus maintained in a state illustrated in FIG. 5 unless the rod 19b is retracted. Meanwhile, when the rod 19b is retracted, the rotary base 16 is rotated counterclockwise by the restoring force of the urging member 20, so that the pressing part 24 is pressed against the adhesive member 1 clamped between the contact part 27 and the base surface 15a (see FIG. 13). Thus, an angle of the rotary base 16 relative to the clamping base 15 can be adjusted by changing the projection length of the rod 19b.

As described above, a clamping mechanism configured to clamp and release the adhesive member 1 is realized with the clamping base 15 and the cylinder mechanism 18. Further, a pressing mechanism configured to press the adhesive member 1 against the object 2 is realized with the rotary base 16, the pressing part 24, the urging member 20, the cylinder mechanism 19 and the like.

<Sticking Method of Adhesive Member 1>

Next, a method of sticking the adhesive member 1 on the object 2 is described with reference to FIGS. 8 to 14.

Figure 8:
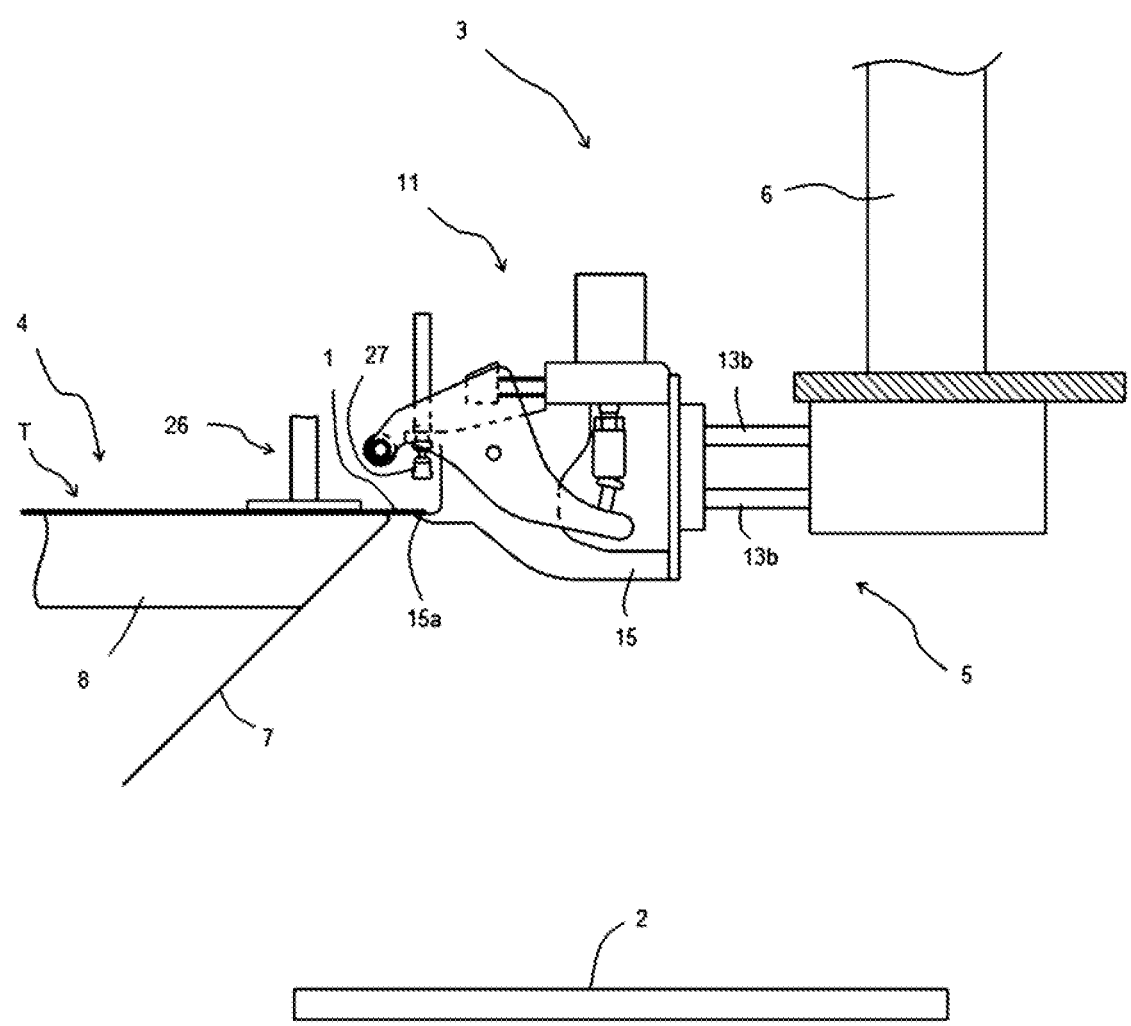
FIG. 8 is a front view illustrating a step of clamping and sticking an adhesive member 1 on an object 2.

(1) First, as illustrated in FIG. 8, the three adhesive members 1 in the top row C1 are separated from the cover material 7.

(2) Then, as illustrated in FIG. 8, the adhesive members 1 in the second row C2 are pressed by the pressing means 26.

(3) Then, as illustrated in FIG. 8, the clamping unit 11 to clamp the adhesive member 1 is projected beyond the other clamping units 11 by operating the cylinder mechanism 13 to which the clamping unit 11 to clamp the adhesive member 1 is attached to elongate the projection length of the rod 13b (see FIGS. 4A and 4B). Here, in order to simultaneously clamp the three adhesive members 1 in the top row C1 by the clamping unit group 11g including the three clamping units 11, the projection length of each of the rods 13b of the cylinder mechanism group 13g to which the clamping unit group 11g is attached is elongated. In such a state, the adhesive member 1 is disposed between the base surface 15a and the contact part 27. The adhesive layer 1a of the adhesive member 1 may be contacted with the base surface 15a at this time.

Figure 9:
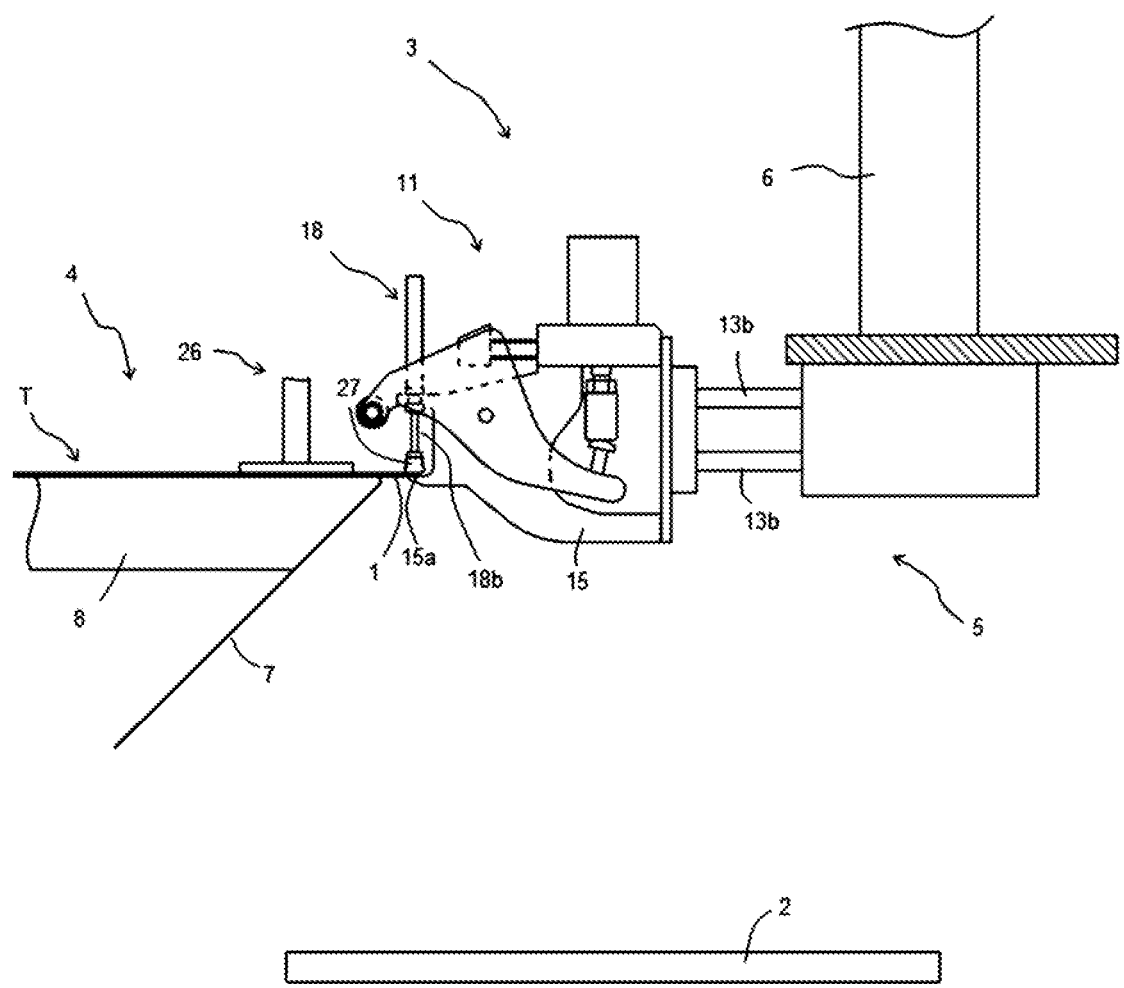
FIG. 9 is a front view illustrating a step of clamping and sticking the adhesive member 1 on the object 2.

(4) Then, as illustrated in FIG. 9, the adhesive member 1 is clamped between the base surface 15a and the contact part 27 by increasing the projection length of the rod 18b. The three clamping units 11 included in the clamping unit group 11g simultaneously clamp the three adhesive members 1 in the top row C1 at this time.

Figure 10:
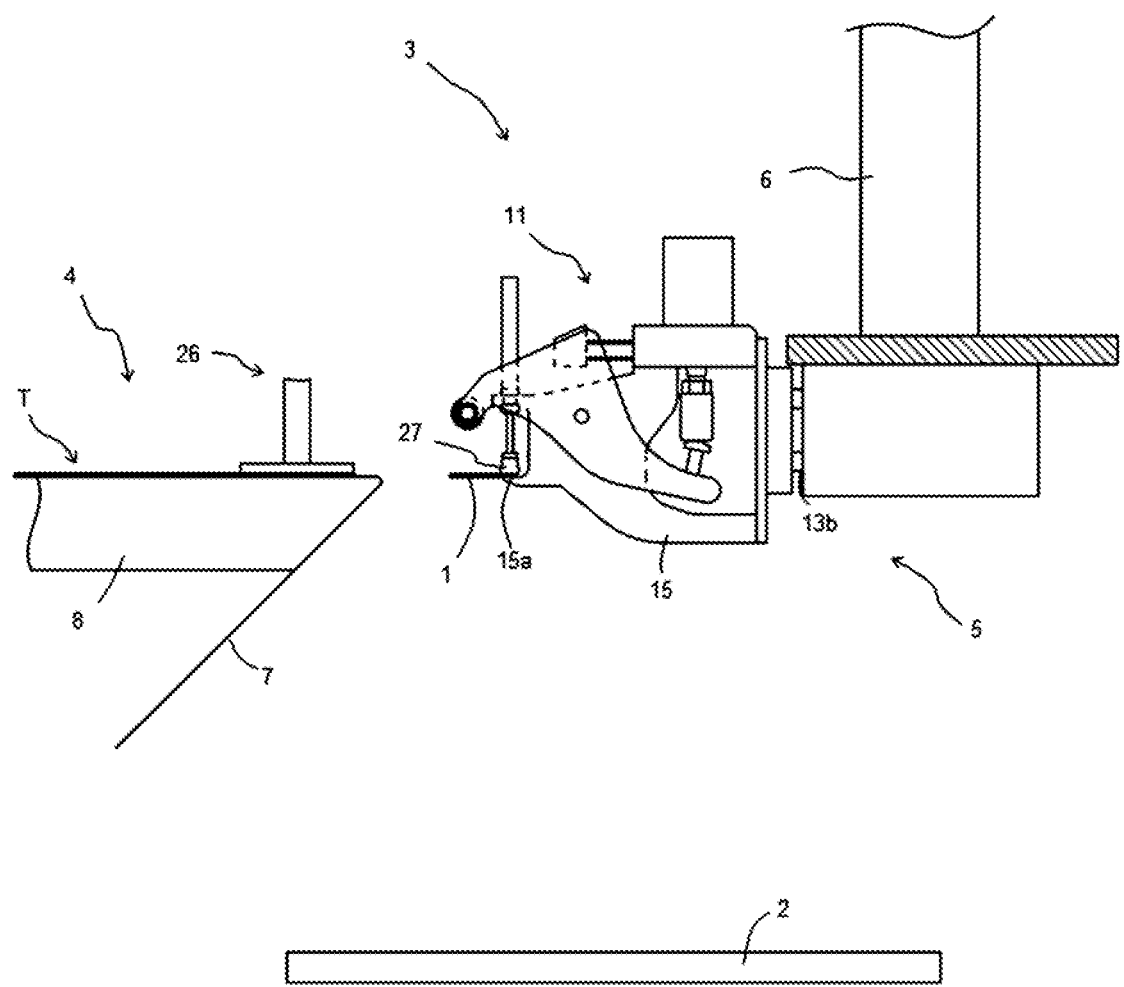
FIG. 10 is a front view illustrating a step of clamping and sticking the adhesive member 1 on the object 2.

(5) Then, as illustrated in FIG. 10, the adhesive members 1 are completely separated from the tape member T by moving the clamping units 11 with the robot arm 6 and reducing the projection length of the rod 13b.

(6) The nine adhesive members 1 are clamped by the nine clamping units 11 by performing the steps above with the three clamping unit groups 11g.

Figure 11:
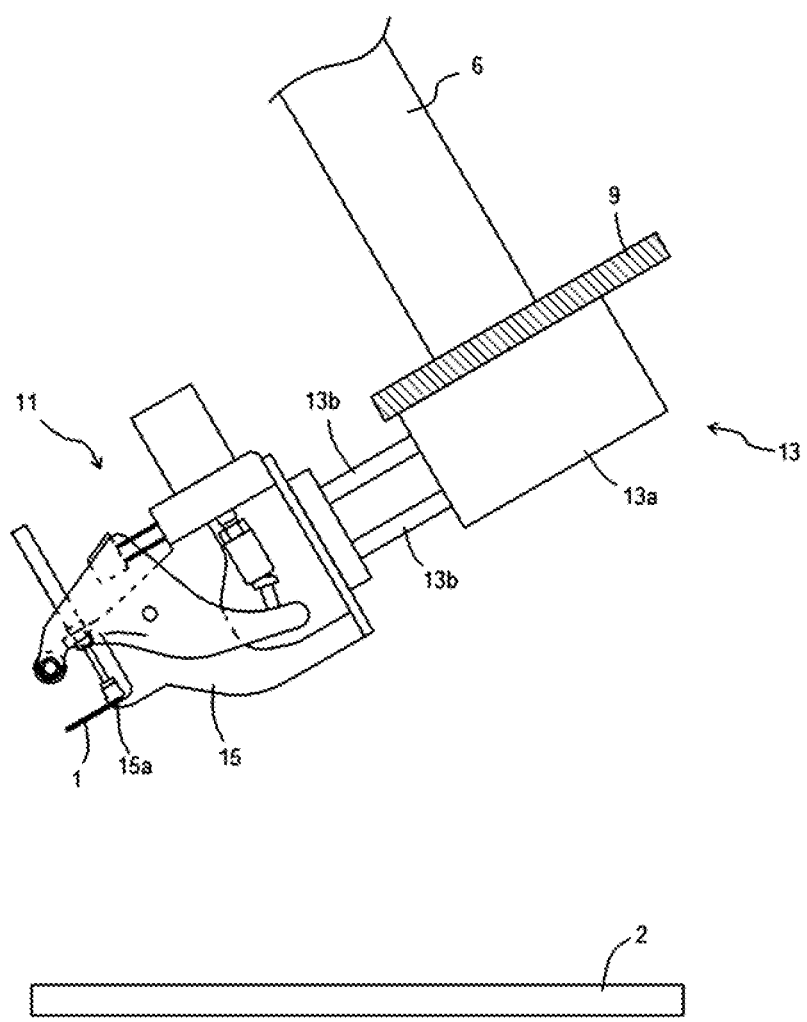
FIG. 11 is a front view illustrating a step of clamping and sticking the adhesive member 1 on the object 2.

(7) Then, as illustrated in FIG. 11, the robot hand 5 is inclined so that the adhesive member 1 approaches the object 2, and the cylinder mechanism 13 to which the clamping unit 11 holding the adhesive member 1 to be stuck is attached is operated to increase the projection length of the rod 13b. Consequently, one clamping unit 11 is projected beyond the other clamping units 11 (see FIGS. 4A and 4B).

Figure 12:
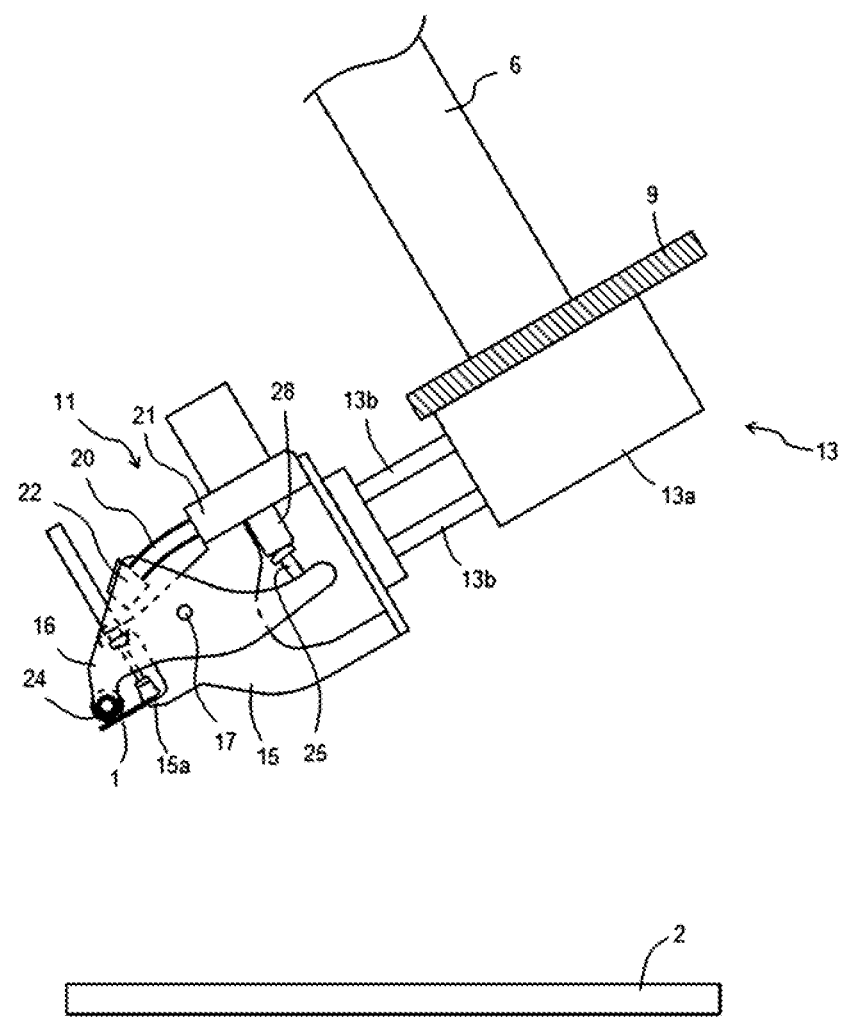
FIG. 12 is a front view illustrating a step of clamping and sticking the adhesive member 1 on the object 2.

(8) Then, as illustrated in FIG. 12, the projection length of the rod 19b (see FIG. 5) is reduced, so that the rotary base 16 is rotated counterclockwise by the restoring force of the urging member 20 to contact the pressing part 24 with the adhesive member 1. The contact part 28 comes in contact with the positioning bolt 25 in a state of FIG. 12. The projection length of the rod 19b is set so that the pressing part 24 is contacted with the adhesive member 1 but the restoring force of the urging member 20 is not applied to the adhesive member 1.

Figure 13:
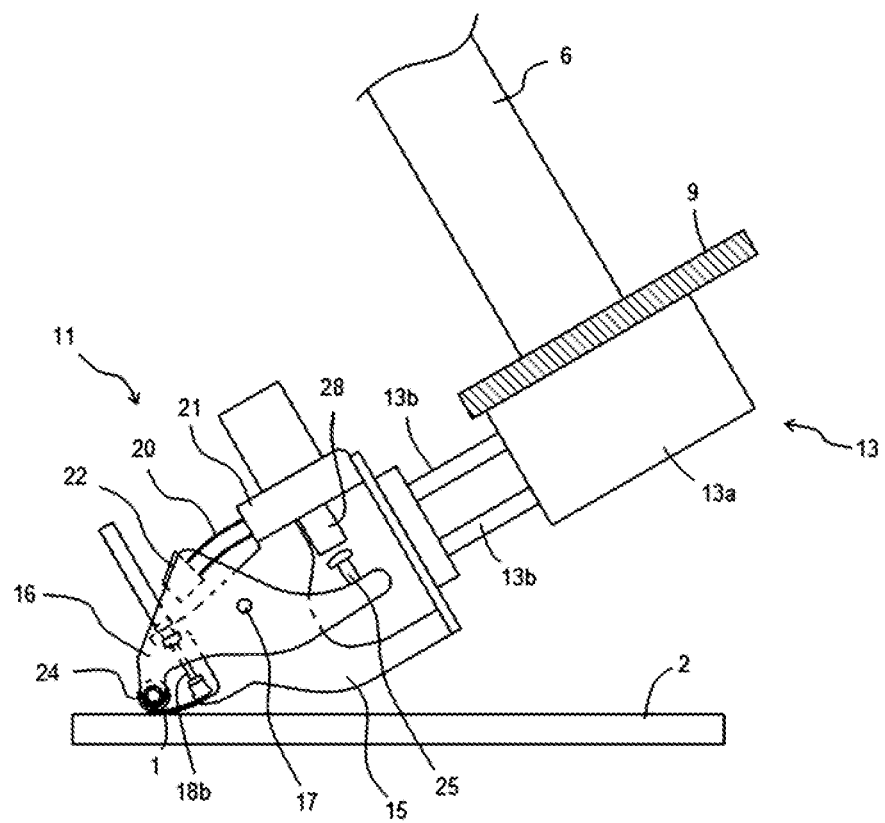
FIG. 13 is a front view illustrating a step of clamping and sticking the adhesive member 1 on the object 2.

(9) Then, as illustrated in FIG. 13, the adhesive member 1 is contacted with the object 2. In a state of FIG. 13, the contact part 28 and the positioning bolt 25 are not in contact with each other, and the restoring force of the urging member 20 is applied to the adhesive member 1 via the pressing part 24.

Figure 14:
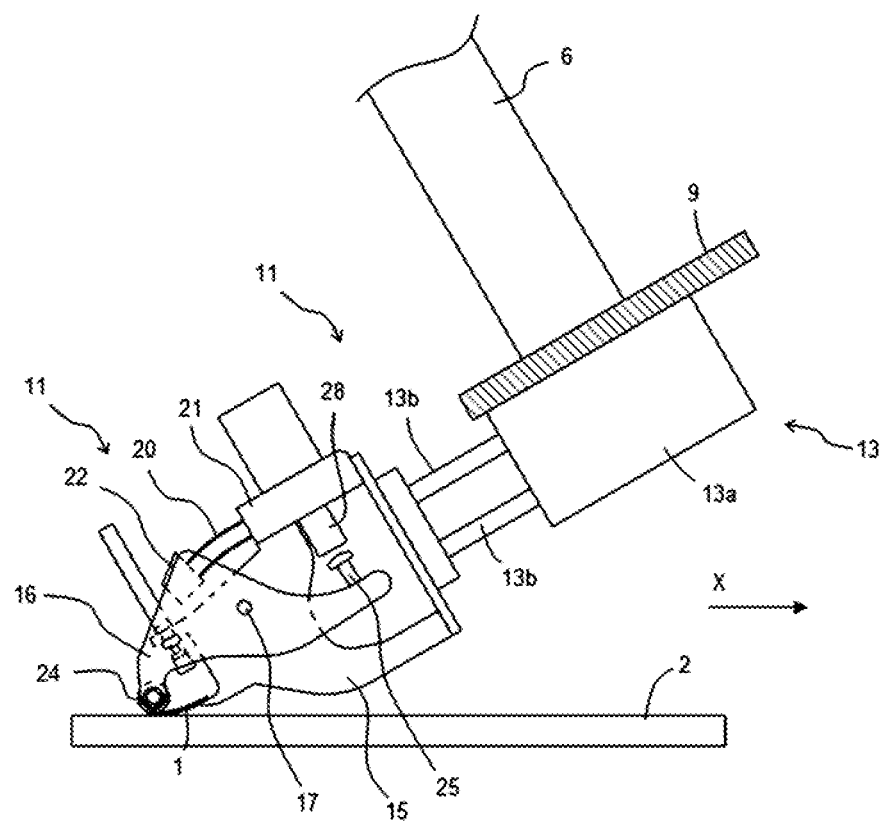
FIG. 14 is a front view illustrating a step of clamping and sticking the adhesive member 1 on the object 2.

(10) Then, as illustrated in FIGS. 13 and 14, the adhesive member 1 is released from a clamped state by the base surface 15a and the contact part 27 by reducing the projection length of the rod 18b. Then, as illustrated with an arrow X in FIG. 14, the adhesive member 1 is stuck on the object 2 by moving the clamping unit 11 along a surface of the object 2.

(11) Then, the adhesive member 1 can be stuck to nine parts of the object 2 by repeatedly performing the steps (7) to (10) for all the adhesive members 1.

The present invention may be also practiced in the following aspects.

The number of the adhesive member 1 provided in each row of the tape member T may be one, two, or four or more, and preferably more than one.

The number of the clamping unit 11 included in the clamping unit group 11g may be one, two, or four or more, and preferably more than one.

The number of the clamping unit group 11g may be one, two, or four or more, and preferably more than one.

Each operation included in the steps (7) to (10) may be switched in order as appropriate.

The pressing part 24 may be brought into contact with the adhesive member 1 after bringing the adhesive member 1 into contact with the object 2.

The projection length of the rod 13b may be increased after bringing the pressing part 24 into contact with the adhesive member 1.

The robot hand 5 may be inclined after bringing the pressing part 24 into contact with the adhesive member 1.

B: Embodiment of Cutting Blade

The adhesive member 1 used in the above-mentioned robot system can be formed by sticking the cover material 7 on an adhesive layer of a large-area sheet and then making a cut (half-cut) in the large-area sheet to cut the large-area sheet into a large number of the adhesive members 1.

It is necessary to use a cutting blade for making a cut in the large-area sheet. As a cutting technique using the cutting blade, there is a technique for cutting a flat material into a rectangular shape by press punching using a flat material cutting blade comprising a holding plate on which a slit for inserting the cutting blade is formed such that an arrangement shape corresponds to a shape to be obtained by cutting and the cutting blade inserted into and held by the slit.

However, it is necessary in the technique to process flat materials one by one, and thus low production efficiency is problematic.

The present invention has been made in view of such a circumstance and is to provide a cutting blade capable of efficiently performing a process of cutting a workpiece to generate a plurality of pieces of the workpiece.

According to the present embodiment, provided is a cutting blade for cutting a workpiece by pressing a blade edge against the workpiece to generate a plurality of pieces of the workpiece, wherein the cutting blade comprises a transverse direction blade and a machine direction blade; the machine direction blade is connected to the transverse direction blade so as to divide the transverse direction blade into a plurality of portions; and at least one end of the machine direction blade is an open end.

The cutting blade of the present embodiment is characterized in that at least one end of the machine direction blade is an open end. When such a cutting blade is used, it is possible to efficiently produce a large number of pieces of the workpiece arranged in a grid pattern by alternately cutting the workpiece and moving the workpiece. In addition, no offcuts occur between two adjacent pieces of the workpiece. Thus, less material is wasted, and time required for processing the offcuts can be reduced.

Hereinafter, various embodiments are exemplified. The embodiments below can be combined with each other.

Preferably, the transverse direction blade and the machine direction blade are orthogonal to each other.

Preferably, a blade edge of the machine direction blade is connected to a blade edge of the transverse direction blade.

Preferably, the cutting blade comprises a plurality of machine direction blades.

According to another aspect of the present embodiment, provided is a method of manufacturing pieces of a band-shaped workpiece comprising a cutting step and a moving step, wherein, in the cutting step, a blade edge of the above-mentioned cutting blade is pressed against the workpiece to cut the workpiece; in the moving step, the workpiece is moved in a longitudinal direction of the workpiece; the cutting step and the moving step are performed alternately; and every time the cutting step is performed, the workpiece is cut to generate a plurality of pieces of the workpiece.

Preferably, the cutting blade is pressed against the workpiece while the machine direction blade is parallel to the longitudinal direction.

Preferably, a movement amount of the workpiece in the moving step is equal to (length of the pieces of the workpiece in the longitudinal direction)×(number of the transverse direction blade).

Preferably, the workpiece is supplied by a roll-to-roll method.

Preferably, the cutting blade is disposed so that the machine direction blade is directed upstream of a moving direction of the workpiece.

Preferably, the cutting blade is held by a holder, and the cutting step is performed such that an elastic member provided between the holder and the workpiece is compressed and deformed.

Preferably, the workpiece comprises an adhesive layer on one surface; a cover material is provided on a side of the adhesive layer; and the cutting step is performed such that the cover material is not cut by the cutting blade.

1. First Embodiment of Cutting Blade

A cutting blade 101 of a first embodiment and a manufacturing method of pieces of a workpiece 116 by means of the cutting blade 101 are described with reference to FIGS. 15A to 21.

Figure 15A:
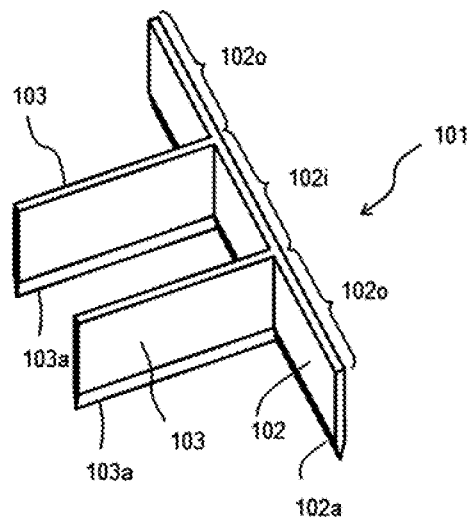
FIGS. 15A and 15B illustrate a cutting blade according to an embodiment of the present invention, showing a cutting blade 101 of a first embodiment.
Figure 15B:
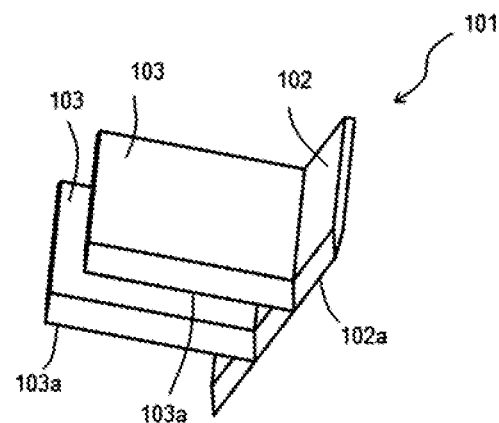
Figure 18:
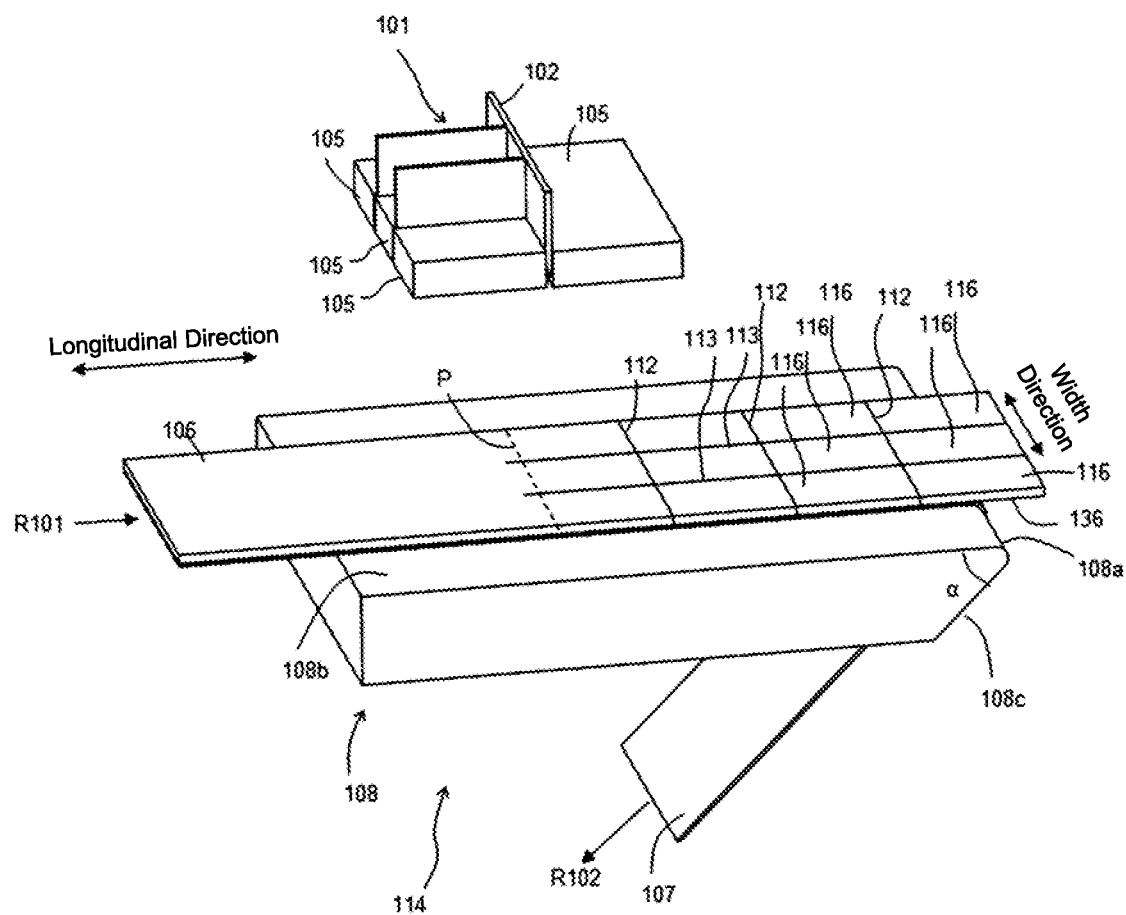
FIG. 18 is a perspective view illustrating a step of cutting a workpiece 106 by means of the cutting blade 101 to generate a plurality of pieces of the workpiece 116, showing a state before cutting the workpiece 106 just below the cutting blade 101. The holder 104 is omitted in FIGS. 18 to 21.

As illustrated FIGS. 15A, 15B, and 18, the cutting blade 1 is used for cutting a workpiece 106 by pressing blade edges 102a, 103a against the workpiece 106 to generate a plurality of pieces 116 of the workpiece.

As illustrated in FIG. 15A, the cutting blade 101 comprises a transverse direction blade 102 and two machine direction blades 103. The transverse direction blade 102 comprises a blade edge 102a. The machine direction blade 103 comprises a blade edge 103a. The blade edges 102a, 103a are both linear. As illustrated in FIG. 15B, the blade edge 103a of the machine direction blade 103 is connected to the blade edge 102a of the transverse direction blade 102. The blade edge 102a and the blade edge 103a are thus continuously connected without a gap, and the problem that the workpiece 106 is not cut between the blade edge 102a and the blade edge 103a does not occur.

In the following description, a direction in which the transverse direction blade 102 extends is referred to as a width direction, and a direction in which the machine direction blade 103 extends is referred to as a longitudinal direction. Further, as described later, the workpiece 106 and the pieces 116 of the workpiece are moved in a direction in which the machine direction blade 103 extends. Therefore, a moving direction of the workpiece 106 and the pieces 116 of the workpiece coincides with the longitudinal direction.

The transverse direction blade 102 and the machine direction blade 103 are orthogonal to each other. The machine direction blade 103 is connected to the transverse direction blade 102 so as to divide the transverse direction blade 102 into a plurality of portions. The two machine direction blades 103 are provided, and the transverse direction blade 102 is divided into three portions by the two machine direction blades 103. That is, the transverse direction blade 102 is divided into N+1 portions by N machine direction blades 103. N is a natural number of 1 or more. The transverse direction blade 102 is divided into an inner portion 102i and two outer portions 102o. The inner portion 102i and the two outer portions 102o respectively correspond to one piece 116 of the workpiece. A length of the inner portion 102i is equal to a length of the pieces 116 of the workpiece in the width direction. A length of the outer portions 102o is equal to or more than the length of the pieces 116 of the workpiece in the width direction.

The two machine direction blades 103 extend in parallel. A gap between the blade edges 103a of the two machine direction blades 103 coincides with the length of the pieces 116 of the workpiece in the width direction. A length of the machine direction blade 103 is equal to or more than a length of the pieces 116 of the workpiece in a moving direction. In order to reliably divide the workpiece 106, the length of the machine direction blade 103 may be preferably longer than the length of the pieces 116 of the workpiece in the moving direction.

The machine direction blade 103 is connected to the transverse direction blade 102 at one end, and the other end is an open end. The machine direction blade 103 is not connected to the transverse direction blade 102 at the open end and is not connected to any other member. Further, the open ends of a pair of the machine direction blades 103 are not connected to each other. Such a configuration suppresses the generation of offcuts in the longitudinal direction of the workpiece 106.

Figure 16:
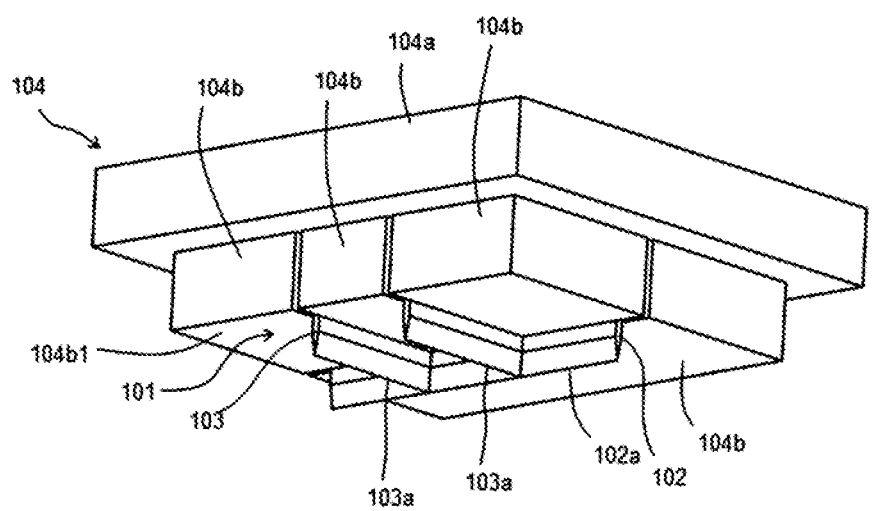
FIG. 16 is a perspective view illustrating a state in which the cutting blade 101 of FIGS. 15A and 15B is held by a holder 104.

As illustrated in FIG. 16, the cutting blade 101 may be used in a state of being held by a holder 104. The holder 104 comprises a base part 104a and a plurality of fixing parts 104b. The transverse direction blade 102 and the machine direction blades 103 are held between two adjacent fixing parts 104b.

Figure 17:
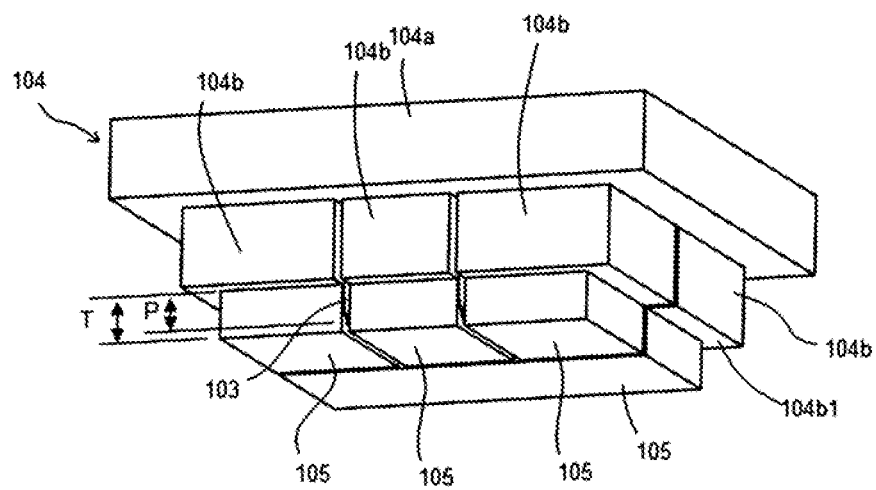
FIG. 17 is a perspective view illustrating a state in which an elastic member 105 is attached to the holder 104 of FIG. 16.

As illustrated in FIG. 17, each of the fixing parts 104b comprises a facing surface 104b1 facing the workpiece 106. An elastic member 105 is mounted on the facing surface 104b1. The elastic member 105 is compressed and deformed while the cutting blade 101 is pressed against the workpiece 106, and restores its original shape when the cutting blade 101 is separated from the workpiece 106. Adhesion of the workpiece 106 and the pieces 116 of the workpiece to the cutting blade 101 is suppressed by a restoring force at this time. If the workpiece 106 and the pieces 116 of the workpiece comprise an adhesive layer 136, there is great technical significance in providing an elastic member 105 since the adhesive layer 136 can easily adhere to the cutting blade 101 when the workpiece 106 is cut. The elastic member 105 may be, for example, a buffer member or a spring.

Assuming that a thickness of the elastic member 105 in a non-compressed state is T, a projection length of the cutting blade 101 from the facing surface 104b1 is P, and a thickness of the workpiece 106 is WT, it is preferable to satisfy $\alpha \times T + WT > P$ ($\alpha < 1$), and more preferably to satisfy $\alpha \times T > P$ ($\alpha < 1$). Since the elastic member 105 is compressed and deformed in this case when the workpiece 106 is cut by the cutting blade 101, the adhesion of the workpiece 106 and the pieces 116 of the workpiece to the cutting blade 101 is suppressed by the restoring force. $\alpha$ may be, for example, 0.3 to 0.9, specifically, for example, 0.3, 0.4, 0.5, 0.6, 0.7, 0.8, 0.9, or may be in a range between any two of the values exemplified herein. $\alpha$ is appropriately set so as to generate a restoring force needed in accordance with a material of the elastic member 105.

Next, a method of cutting the workpiece 106 by means of the cutting blade 101 to generate the plurality of pieces 116 of the workpiece is described.

FIG. 18 is a perspective view illustrating a basic configuration of a cutting device for cutting the workpiece 106. The workpiece 106 is assumed to have a certain thickness. The thickness of the workpiece 106 and the pieces 116 of the workpiece may be, for example, 0.5 to 5 mm, specifically, for example, 0.5, 1, 1.5, 2, 2.5, 3, 3.5, 4, 4.5, 5 mm, or may be in a range between any two of the values exemplified herein. The pieces 116 of the workpiece is stuck on an object for the purpose of preventing rattling or a vibration, noise reduction, or the like. The material thereof is not specifically limited, and may be, for example, a nonwoven fabric. The object may be, for example, an automobile interior member, such as a deck board.

The workpiece 106 is band-shaped. A length of the workpiece 106 in the width direction may be preferably N times (N is a natural number of 2 or more) the length of the pieces 116 of the workpiece in the width direction. N may be preferably the number of the machine direction blade 103+1. In the present embodiment, the number of the machine direction blades 103 is two, and the length of the workpiece 106 in the width direction is three times the length of the pieces 116 of the workpiece in the width direction. The pieces 116 of the workpiece are rectangular or square. A length of the pieces 116 of the workpiece in the longitudinal direction and in the width direction each may be preferably 1 to 5 cm, specifically, for example, 1, 2, 3, 4, 5 cm, or may be in a range between any two of the values exemplified herein.

The workpiece 106 and the pieces 116 of the workpiece comprises an adhesive layer 136 on one surface. A cover material 107 is stuck on a surface on a side of the adhesive layer 136. The cover material 107 has a function of covering the adhesive layer 136. A paper or a sheet (so-called release paper) whose surface facing the adhesive layer 136 is subjected to easy peeling treatment is suitably used as the cover material 107. Since the cover material 107 is not cut when the workpiece 106 is cut, the pieces 116 of the workpiece generated by cutting the workpiece 106 are arranged in a grid pattern on the cover material 107.

The workpiece 106 is supplied by a roll-to-roll type supply mechanism 114. The supply mechanism 114 comprises a delivery roller R101, a take-up roller R102, and a receiving jig 108 provided therebetween. A workpiece roll in which the workpiece 106 is wound is mounted on the delivery roller R101, and the workpiece 106 is supplied toward the receiving jig 108 associated with a rotation of the delivery roller R101 in a rewinding direction. The workpiece 106 is cut by the cutting blade 101 at the receiving jig 108 to generate the plurality of pieces 116 of the workpiece. Then, the pieces 116 of the workpiece are separated from the cover material 107 by bending, at a tip 108a of the receiving jig 108, the cover material 107 in a direction away from the pieces 116 of the workpiece. In this state, the pieces 116 of the workpiece is clamped and picked up by the robot hand or the like. The cover material 107 is taken up associated with a rotation of the take-up roller R102. Rotational speeds of the delivery roller R101 and the take-up roller R102 are adjusted so that the cover material 107 is maintained in a tensioned state. Further, a tension roller for adjusting a tension applied to the cover material 107 is provided as needed between the delivery roller R101 and the take-up roller R102.

The receiving jig 108 comprises the tip 108a, an upper surface 108b, and an inclined surface 108c. The tip 108a is provided to be connected to the upper surface 108b and the inclined surface 108c. The cover material 107 is guided from the delivery roller R101 to the take-up roller R102 via the upper surface 108b, the tip 108a, and the inclined surface 108c in this order. An angle between the upper surface 108b and the inclined surface 108c at the tip 108a is not specifically limited, and may be for example, 15 to 75 degrees, preferably 30 to 60 degrees, and more preferably 40 to 50 degrees. This is because the pieces 116 of the workpiece can be easily separated from the cover material 107 in a case of such an angle. A radius of curvature of the tip 108a may be preferably equal to or less than a length L of the pieces 116 of the workpiece in the longitudinal direction, because the pieces 116 of the workpiece can be easily separated from the cover material 107 in such a case.

FIG. 18 illustrates a state after generating nine pieces 116 of the workpiece by cutting the workpiece 106 with the cutting blade 101. The workpiece 106 is divided in the longitudinal direction by a transverse direction dividing line 112 extending in the width direction of the workpiece 106. Further, the workpiece 106 is divided in the width direction by a machine direction dividing line 113 extending in the longitudinal direction of the workpiece 106. As a result of dividing the workpiece 106 by the transverse direction dividing line 112 and the machine direction dividing line 113, the pieces 116 of the workpiece is formed in an area surrounded by the transverse direction dividing line 112 and the machine direction dividing line 113. In a state of FIG. 18, nine pieces of the workpiece 116 are formed by three transverse direction dividing lines 112 and two machine direction dividing lines 113. The transverse direction dividing line 112 is formed by the transverse direction blade 102. The machine direction dividing line 113 is formed by the machine direction blade 103.

In the state of FIG. 18, the workpiece 106 is not cut at a line segment P located just below the transverse direction blade 102. The machine direction dividing lines 113 extend slightly beyond the line segment P.

Figure 19:
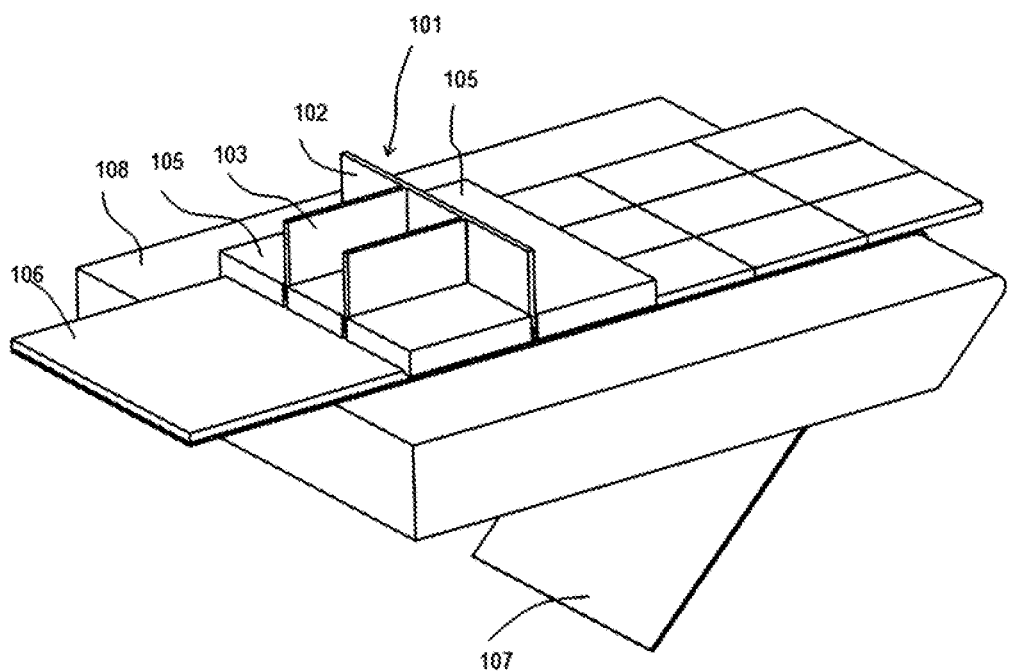
FIG. 19 is a perspective view illustrating a state of cutting the workpiece 106 by means of the cutting blade 101.
Figure 20:
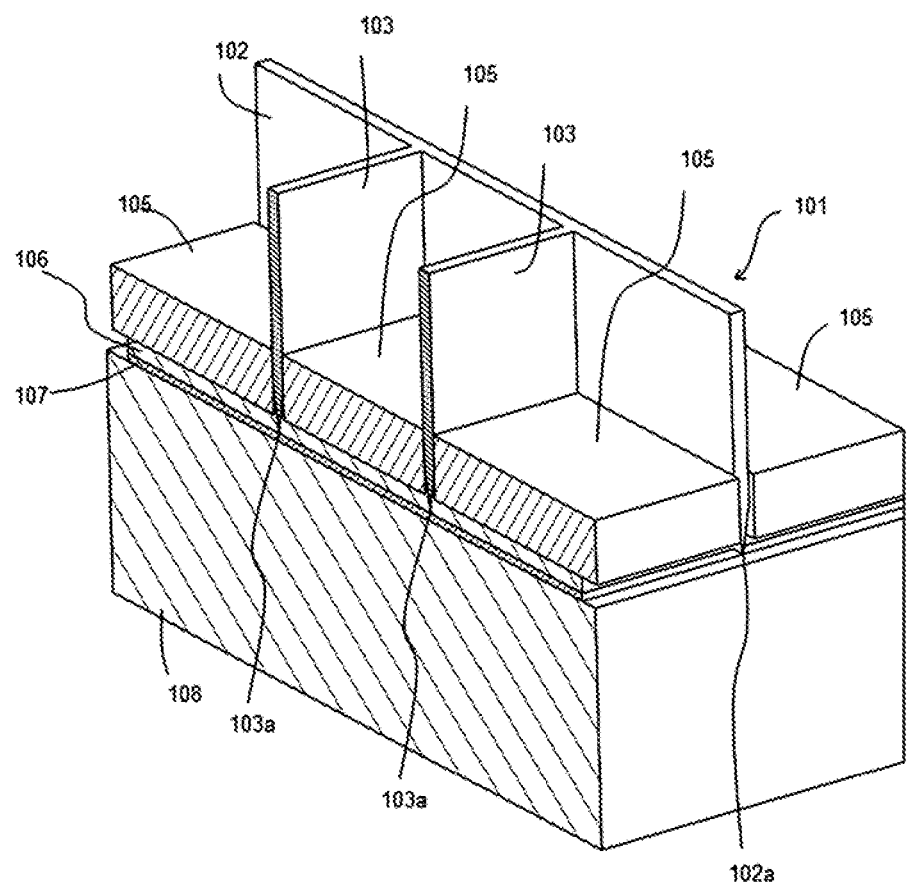
FIG. 20 is a cross-sectional view of FIG. 19, showing a cross section perpendicular to a machine direction blade 103.
Figure 21:
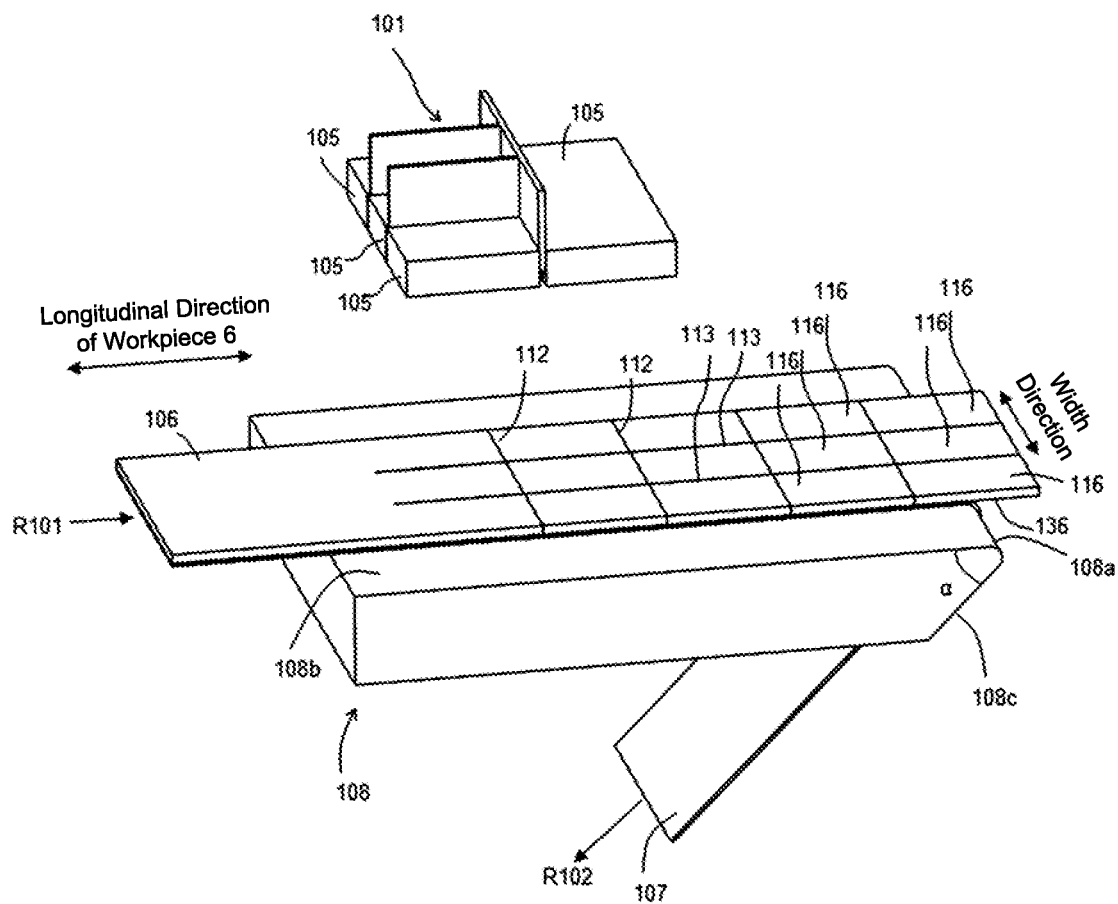
FIG. 21 is a perspective view illustrating a state immediately after cutting the workpiece 106 just below the cutting blade 101.
Figure 22:
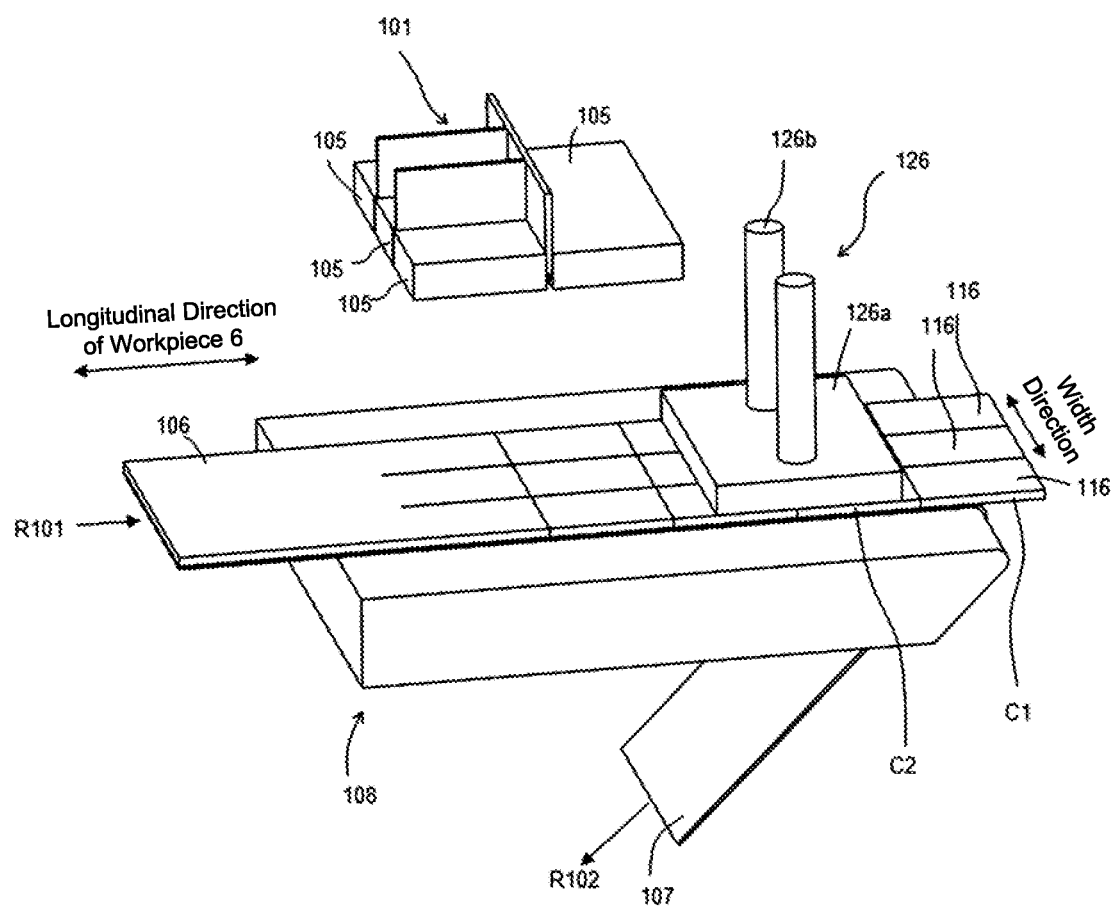
FIG. 22 is a perspective view illustrating a state in which the pieces 116 of the workpiece in a second row C2 are pressed by a pressing unit 126.

In the cutting step, the cutting blade 101 is pressed against the workpiece 106 from the state of FIG. 18, as illustrated in FIGS. 19 and 20. At this time, the elastic member 105 is compressed and deformed by being pressed against the workpiece 106 by the fixing parts 104b (see FIG. 17). The elastic member 105 is compressed and deformed, so that the blade edges 102a, 103a are projected from the elastic member 105 and pressed against the workpiece 106 to cut the workpiece 106. Consequently, as illustrated in FIG. 21, the transverse direction dividing line 112 is formed at a position of the line segment P by the transverse direction blade 102, and the machine direction dividing line 113 is extended by the machine direction blades 103. The cutting blade 101 is pressed against the workpiece 106 by a cylinder mechanism provided on the base part 104a, and the like. Further, a pressing force of the cutting blade 101 and a movement amount of the cutting blade 101 are set so that the cover material 107 is not cut by the cutting blade 101.

The cutting blade 101 is pressed against the workpiece 106 while the machine direction blades 103 is parallel to the longitudinal direction of the workpiece 106. The machine direction blade 103 may be directed upstream or downstream of a moving direction of the workpiece 106 and may be preferably directed upstream. When there is a cutting failure, the pieces 116 of the workpiece on a downstream side from the cutting blade 101 are discarded. If the machine direction blade 103 is directed upstream, the number of the pieces 116 of the workpiece to be discarded may be smaller than when the machine direction blade 103 is directed downstream.

When the cutting blade 101 moves up from a state of FIGS. 19 and 20, the elastic member 105 expands to restore the original shape. At this time, the adhesion of the workpiece 106 and the pieces 116 of the workpiece to the cutting blade 101 is suppressed by the restoring force.

FIG. 21 illustrates a state immediately after the cutting step is completed. The transverse direction dividing line 112 is formed at the position of the line segment P by the transverse direction blade 102, and the machine direction dividing lines 113 are extended by the machine direction blades 103. Consequently, three pieces of the workpiece 116 are newly generated.

Then, three pieces 116 of the workpiece in the top row C1 protruding from the receiving jig 108 are clamped and picked up by the robot hand, and then the moving step is performed.

The pieces 116 of the workpiece are picked up while the pieces 116 of the workpiece in the second row C2 are pressed by a pressing unit 126. This can prevent the pieces 116 of the workpiece in the second row C2 from being picked up together. The pressing unit 126 may press only the pieces 116 of the workpiece in the second row C2 or may press the pieces 116 of the workpiece in a third and subsequent rows together. In one example, the pressing unit 126 comprises a plate part 126a coming into contact with the pieces 116 of the workpiece and a cylinder mechanism 126b for pressing the plate part 126a against the pieces 116 of the workpiece. In this regard, the pieces 116 of the workpiece are picked up after the cutting step in the present embodiment, but the pieces 116 of the workpiece may be picked up after the moving step and before the cutting step. The pressing unit 126 is moved away from the pieces 116 of the workpiece after picking up the pieces 116 of the workpiece to allow the workpiece 106 and the pieces 116 of the workpiece to be moved. Although the pressing unit 126 is not illustrated in FIGS. 18, 19, and 21 for convenience of illustration, the pressing unit 126 is disposed at a retracted position above the pieces 116 of the workpiece in the second row C2 while the pressing unit 126 is not pressing the pieces 116 of the workpiece.

In the moving step, the workpiece 106 is moved in the longitudinal direction of the workpiece 106. The movement amount of the workpiece 106 is equal to (the length of the pieces 116 of the workpiece in the longitudinal direction)× (the number of the transverse direction blade 102). In the present embodiment, the number of the transverse direction blade 102 is one, and thus the movement amount of the workpiece 106 is equal to the length of the pieces 116 of the workpiece of the longitudinal direction.

Thereafter, by repeating the cutting step and the moving step, three pieces 116 of the workpiece are newly formed each time the cutting process is performed.

According to the present embodiment, the pieces 116 of the workpiece can be manufactured continuously, as described above, and thus production efficiency is high. In addition, since the entire workpiece 106 is divided to generate the pieces 116 of the workpiece, no cutoffs are generated.

2. Second Embodiment

Figure 23:
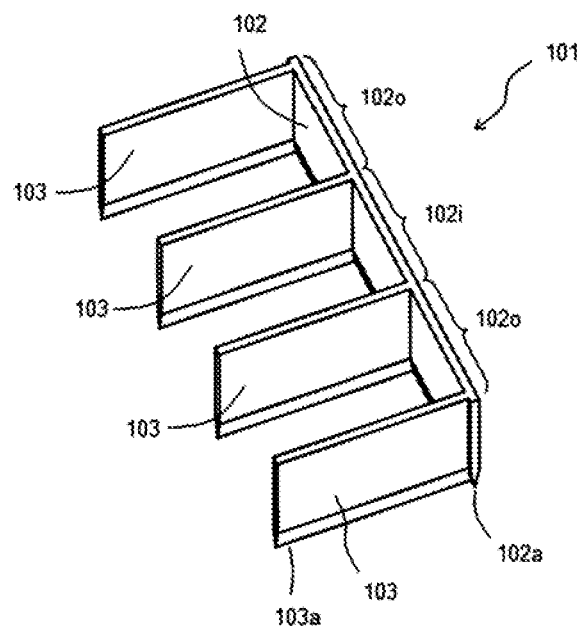
FIG. 23 is a perspective view as viewed from an upper surface side, illustrating a cutting blade 101 of a second embodiment.

A second embodiment of the cutting blade is described with reference to FIG. 23. The present embodiment is similar to the first embodiment, and the main difference is in the number of machine direction blades 103. The difference is mainly described below.

In the present embodiment, a cutting blade 101 comprises four machine direction blades 103. A transverse direction blade 102 is divided by the machine direction blades 103 into an inner portion 102i and two outer portions 102o. Each of the portions 102i, 102o corresponds to one piece 116 of a workpiece.

A function and configuration of two machine direction blades 103 on an inner side in the width direction among the four machine direction blades 103 are the same as in the first embodiment. Two machine direction blades 103 on an outer side in the width direction are not used for cutting the workpiece 106 when a length of the workpiece 106 in the width direction is equal to the total length of the portions 102*i*, 102*o*. On the other hand, when the length of the workpiece 106 in the width direction is larger than the total length of the portions 102*i*, 102*o*, the workpiece 106 is cut off by the two machine direction blades 103 on the outer side in the width direction so that the length of the workpiece 106 in the width direction is equal to the total length of the portions 102*i*, 102*o*.

3. Third Embodiment

Figure 24:
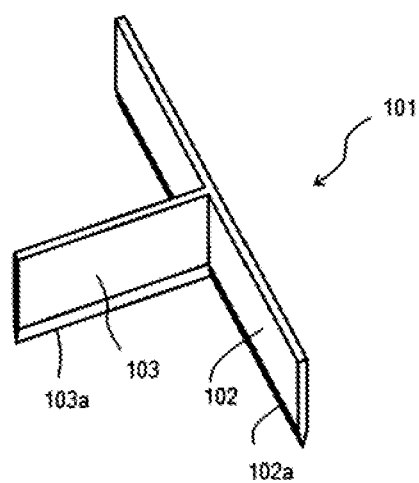
FIG. 24 is a perspective view as viewed from an upper surface side, illustrating a cutting blade 101 of a third embodiment.

A third embodiment of the cutting blade is described with reference to FIG. 24. The present embodiment is similar to the first embodiment, and the main difference is in the number of a machine direction blade 103. The difference is mainly described below.

In the present embodiment, only one machine direction blade 103 is provided. A transverse direction blade 102 is thus divided by the machine direction blade 103 into two portions. Two pieces 116 of the workpiece are generated in one cycle of the cutting step and the moving step.

4. Fourth Embodiment

Figure 25:
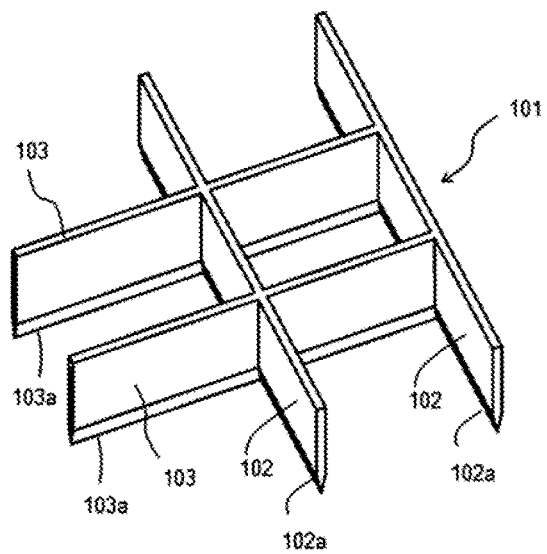
FIG. 25 is a perspective view as viewed from an upper surface side, illustrating a cutting blade 101 of a fourth embodiment.

A fourth embodiment of the cutting blade is described with reference to FIG. 25. The present embodiment is similar to the first embodiment, and the main difference is in the number of transverse direction blades 102 and a length of machine direction blades 103. The difference is mainly described below.

In the present embodiment, two transverse direction blades 102 are provide. A gap between the adjacent transverse direction blades 102 coincides with the length of the pieces 116 of the workpiece in the longitudinal direction. The length of the machine direction blades 103 is equal to or larger than twice the length of the pieces 116 of the workpiece in the longitudinal direction.

In the present embodiment, the movement amount of the workpiece 106 in the moving step is equal to (the length of the pieces 116 of the workpiece in the longitudinal direction)×(the number of the transverse direction blade 102). Therefore, the movement amount of the workpiece 106 in the present embodiment is twice the length of the pieces 116 of the workpiece in the longitudinal direction. Six pieces 116 of the workpiece are generated in one cycle of the cutting step and the moving step.

5. Fifth Embodiment

Figure 26:
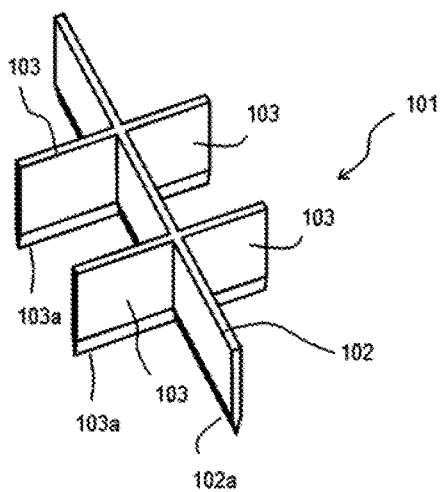
FIG. 26 is a perspective view as viewed from an upper surface side, illustrating a cutting blade 101 of a fifth embodiment.

A fifth embodiment of the cutting blade is described with reference to FIG. 26. The present embodiment is similar to the first embodiment, and the main difference is in a connection mode of the transverse direction blade 102 and the machine direction blades 103. The difference is mainly described below.

In the first embodiment, one end of the machine direction blades 103 is connected to the transverse direction blade 102, and the other end is an open end. In the present embodiment, the machine direction blades 103 are connected to the transverse direction blade 102 at a portion other than end portions of the machine direction blades 103 (a central portion in the present embodiment), and both ends of the machine direction blades 103 are open ends. Even in such a configuration, the pieces 116 of the workpiece can be generated by repeating the cutting step and the moving step, as in the first embodiment.

REFERENCE SIGN LIST

1: adhesive member, 1*a*: adhesive layer, 2: object, 3: sticking mechanism, 4: supply mechanism, 5: robot hand, 6: robot arm, 7: cover material, 8: bending jig, 8*a*: tip, 8*b*: upper surface, 8*c*: inclined surface, 9: holding plate, 10: robot system, 11: clamping unit, 11*g*: clamping unit group, 13: cylinder mechanism, 13*a*: cylinder base, 13*b*: rod, 13*g*: cylinder mechanism group, 15: clamping base, 15*a*: base surface, 16: rotary base, 17: shaft part, 18: cylinder mechanism, 18*a*: cylinder base, 18*b*: rod, 19: cylinder mechanism, 19*a*: cylinder base, 19*b*: rod, 20: urging member, 21: support part of urging member, 22: contact block, 23: support block, 24: pressing part, 25: positioning bolt, 26: pressing means, 26*a*: plate part, 26*b*: cylinder mechanism, 27: contact part, 28: contact part, R1: delivery roller, R2: take-up roller, T: tape member, 101: cutting blade, 102: transverse direction blade, 102*a*: blade edge, 102*i*: inner portion, 102*o*: outer portion, 103: machine direction blade, 103*a*: blade edge, 104: holder, 104*a*: base part, 104*b*: fixing part, 104*b*1: facing surface, 105: elastic member 106: workpiece, 107: cover material, 108: receiving jig, 108*a*: tip, 108*b*: upper surface, 108*c*: inclined surface, 112: transverse direction dividing line, 113: machine direction dividing line, 114: supply mechanism, 116: pieces of workpiece, 126: pressing unit, 126*a*: plate part, 126*b*: cylinder mechanism, 136: adhesive layer, P: line segment, R101: delivery roller, R102: take-up roller

The invention claimed is:

1. A robot system comprising:
a sticking mechanism configured to clamp and stick at least one adhesive member on an object and a supply mechanism capable of supplying the adhesive member,
wherein the sticking mechanism comprises a robot hand configured to clamp and release the adhesive member and a robot arm configured to move the robot hand;
the supply mechanism is separate from the sticking mechanism, supplies the adhesive member in a state that the adhesive member is stuck to a cover material, and separates the cover material from the adhesive member by bending the cover material in a direction away from the adhesive member in order to enable the robot hand to clamp the adhesive member in a state that the cover material is separated from the adhesive member,
wherein the robot hand comprises at least one clamping unit configured to clamp and release the adhesive member,
wherein the clamping unit comprises a clamping mechanism configured to clamp and release the adhesive member and a pressing mechanism configured to press the adhesive member against the object,
wherein the clamping mechanism comprises a clamping base with a base surface and a first cylinder mechanism;
the first cylinder mechanism comprises a first cylinder base and a first rod, a projection length of the first rod from the first cylinder base being variable; and
the clamping mechanism is configured to clamp the adhesive member between the base surface and the first rod.

2. The system of claim 1, wherein the adhesive member is a nonwoven fabric.

3. The system of claim 1, wherein the pressing mechanism has a rotary base rotatable relative to the clamping base and a pressing part provided on the rotary base and pressed against the adhesive member.

4. The system of claim 3, wherein the rotary base is urged in a direction in which the pressing part is pressed against the adhesive member.

5. The system of claim 4, wherein the pressing mechanism comprises a second cylinder mechanism;

the second cylinder mechanism comprises a second cylinder base and a second rod, a projection length of the second rod from the second cylinder base is variable; and the pressing mechanism is configured to adjust an angle of the rotary base relative to the clamping base by changing the projection length of the second rod.

6. A robot system comprising:

a sticking mechanism configured to clamp and stick at least one adhesive member on an object and a supply mechanism capable of supplying the adhesive member, wherein the sticking mechanism comprises a robot hand configured to clamp and release the adhesive member and a robot arm configured to move the robot hand;

the supply mechanism is separate from the sticking mechanism, supplies the adhesive member in a state that the adhesive member is stuck to a cover material, and separates the cover material from the adhesive member by bending the cover material in a direction away from the adhesive member in order to enable the robot hand to clamp the adhesive member in a state that the cover material is separated from the adhesive member, wherein the robot hand comprises at least one clamping unit configured to clamp and release the adhesive member, wherein the robot hand comprises a third cylinder mechanism;

the third cylinder mechanism comprises a third cylinder base and a third rod, a projection length of the third rod from the third cylinder base is variable; and the clamping unit is provided on the third rod.

7. A robot system comprising:

a sticking mechanism configured to clamp and stick at least one adhesive member on an object and a supply mechanism capable of supplying the adhesive member, wherein the sticking mechanism comprises a robot hand configured to clamp and release the adhesive member and a robot arm configured to move the robot hand;

the supply mechanism is separate from the sticking mechanism, supplies the adhesive member in a state that the adhesive member is stuck to a cover material, and separates the cover material from the adhesive member by bending the cover material in a direction away from the adhesive member in order to enable the robot hand to clamp the adhesive member in a state that the cover material is separated from the adhesive member, wherein the robot hand comprises at least one clamping unit configured to clamp and release the adhesive member, wherein the at least one clamping unit comprises a plurality of clamping units;

the at least one adhesive member comprises a plurality of adhesive members;

the robot hand comprises the plurality of clamping units arranged in a line;

the supply mechanism is configured to supply the plurality of adhesive members arranged in a line;

the robot hand is configured to simultaneously clamp the plurality of adhesive members by the plurality of clamping units.

8. The system of claim 7, wherein the robot hand is configured to cause the plurality of clamping units to project one by one so as to stick the plurality of adhesive members one by one to the object.

* * * * *